(12) United States Patent
Kato et al.

(10) Patent No.: US 10,433,340 B2
(45) Date of Patent: *Oct. 1, 2019

(54) BASE STATION APPARATUS, MOBILE STATION APPARATUS, AND COMMUNICATION METHOD

(71) Applicant: Sharp Kabushiki Kaisha, Sakai, Osaka (JP)

(72) Inventors: Yasuyuki Kato, Sakai (JP); Katsunari Uemura, Sakai (JP); Shoichi Suzuki, Sakai (JP)

(73) Assignee: SHARP KABUSHIKI KAISHA, Osaka-Shi, Osaka (JP)

( * ) Notice: Subject to any disclaimer, the term of this patent is extended or adjusted under 35 U.S.C. 154(b) by 107 days.

This patent is subject to a terminal disclaimer.

(21) Appl. No.: 15/341,734

(22) Filed: Nov. 2, 2016

(65) Prior Publication Data

US 2017/0079072 A1 Mar. 16, 2017

Related U.S. Application Data

(63) Continuation of application No. 14/754,004, filed on Jun. 29, 2015, now Pat. No. 9,538,556, which is a
(Continued)

(30) Foreign Application Priority Data

Aug. 6, 2010 (JP) .................. 2010-177918

(51) Int. Cl.
  *H04W 74/08* (2009.01)
  *H04W 74/00* (2009.01)
  *H04W 72/04* (2009.01)

(52) U.S. Cl.
  CPC ..... *H04W 74/0833* (2013.01); *H04W 72/042* (2013.01); *H04W 72/0413* (2013.01); *H04W 72/0446* (2013.01); *H04W 74/002* (2013.01)

(58) Field of Classification Search
  CPC ......... H04W 74/0833; H04W 72/0446; H04W 72/042; H04W 72/0413; H04W 74/002; H04L 5/001
  See application file for complete search history.

(56) References Cited

U.S. PATENT DOCUMENTS 8,369,269 B2 2/2013 Nakashima et al.
8,588,834 B2 * 11/2013 Lee ..................... H04L 5/0007
370/329
(Continued)

FOREIGN PATENT DOCUMENTS

WO WO 2009/038074 A1 3/2009

OTHER PUBLICATIONS

3GPP TR 36.814 V9.0.0, Technical Report, 3rd Generation Partnership Project, Technical Specification Group Radio Access Network, Evolved Universal Terrestrial Radio Access (E-UTRA), Further advancements for E-UTRA physical layer aspects, (Release 9), Mar. 2010.
(Continued)

*Primary Examiner* — Will W Lin
(74) *Attorney, Agent, or Firm* — Birch, Stewart, Kolasch & Birch, LLP

(57) ABSTRACT

A mobile station (MS) obtains a parameter, performs transmission of a preamble, and sets a counter incremented based on transmission of the preamble. The MS is able to indicate a random access problem corresponding to one transmission timing cell group in a case where the counter reaches the parameter+1 and the transmission of the preamble is performed on the one transmission timing cell group, where the one transmission timing cell group being one of the plurality of transmission timing cell groups, and the MS is able to not indicate a random access problem corresponding to another transmission timing cell group in a case where the counter reaches the parameter+1 and the transmission of the pre-
(Continued)

amble is performed on the another transmission timing cell group, where the another transmission timing cell group being one of the plurality of transmission timing cell groups.

3 Claims, 14 Drawing Sheets

Related U.S. Application Data continuation of application No. 13/814,424, filed as application No. PCT/JP2011/066740 on Jul. 22, 2011, now Pat. No. 9,094,989.

(56) References Cited

U.S. PATENT DOCUMENTS

| | | | |
|---|---|---|---|
| 8,743,821 B2 | 6/2014 | Nakashima et al. | |
| 9,094,989 B2* | 7/2015 | Kato | H04W 74/002 |
| 2008/0273482 A1* | 11/2008 | Lee | H04W 72/005 |
| | | | 370/312 |
| 2008/0310395 A1 | 12/2008 | Kashima | |
| 2009/0232095 A1* | 9/2009 | Ahn | H04W 74/006 |
| | | | 370/331 |
| 2010/0067470 A1* | 3/2010 | Damnjanovic | H04L 5/0053 |
| | | | 370/329 |
| 2010/0195507 A1 | 8/2010 | Marinier | |
| 2010/0195636 A1 | 8/2010 | Nakashima et al. | |
| 2010/0296467 A1 | 11/2010 | Pelletier | |
| 2011/0170420 A1* | 7/2011 | Xi | H04L 5/001 |
| | | | 370/241 |
| 2011/0170535 A1* | 7/2011 | Wang | H04W 56/0045 |
| | | | 370/350 |
| 2011/0194478 A1* | 8/2011 | Lee | H04W 74/002 |
| | | | 370/312 |
| 2011/0235609 A1* | 9/2011 | Ahn | H04L 5/0007 |
| | | | 370/329 |
| 2012/0002555 A1* | 1/2012 | Ohuchi | H04W 24/08 |
| | | | 370/244 |
| 2012/0327883 A1* | 12/2012 | Yang | H04L 1/0026 |
| | | | 370/329 |
| 2013/0142146 A1 | 6/2013 | Nakashima et al. | |
| 2014/0233492 A1 | 8/2014 | Nakashima et al. | |

OTHER PUBLICATIONS

3GPP TS 36.300 V9.3.0, Technical Specification, 3rd Generation Partnership Project, Technical Specification Group Radio Access Network, Evolved Universal Terrestrial Radio Access (E-UTRA) and Evolved Universal Terrestrial Radio Access Network (E-UTRAN), Overall description, Stage 2 (Release 9) Mar. 2010.

3GPP TS 36.321 V9.2.0, Technical Specification, 3rd Generation Partnership Project, Technical Specification Group Radio Access Network, Evolved Universal Terrestrial Radio Access (E-UTRA), Medium Access Control (MAC) protocol specification, (Release 9), Mar. 2010.

E-mail rapporteur (NTT Docomo, Inc.), "CA support for multi-TA," 3GPP TSG-RAN2#69, R2-101567, San Francisco, USA, Feb. 22-26, 2010.

Ericsson, ST Ericsson, "Multiple Timing Advance for Carrier Aggregation," 3GPP TSG-RAN WG2#69, Tdoc R2-101196, San Francisco, USA, Feb. 22-26, 2010.

Huawei, "Multiple Timing Advance Impact on RAN2," 3GPP TSG RAN WG2 Meeting #68bis, R2-100110, Valencia, Spain, Jan. 18-22, 2010.

International Search Report issued in PCT/JP2011/066740 dated Aug. 16, 2011.

Qualcomm Incorporated, "Supporting multiple timing advance groups," 3GPP TSG-RAN WG2 meeting#68bis, R2-100423, Valencia, Spain, Jan. 18-22, 2010.

U.S. Notice of Allowance issued in U.S. Appl. No. 13/814,424 dated Mar. 20, 2015.

U.S. Office Action issued in U.S. Appl. No. 13/814,424 dated Nov. 5, 2014.

U.S. Notice of Allowance issued in U.S. Appl. No. 14/754,004 dated Aug. 26, 2016.

U.S. Office Action issued in U.S. Appl. No. 14/754,004 dated Jan. 4, 2016.

U.S. Office Action issued in U.S. Appl. No. 14/754,004 dated Apr. 28, 2016.

* cited by examiner

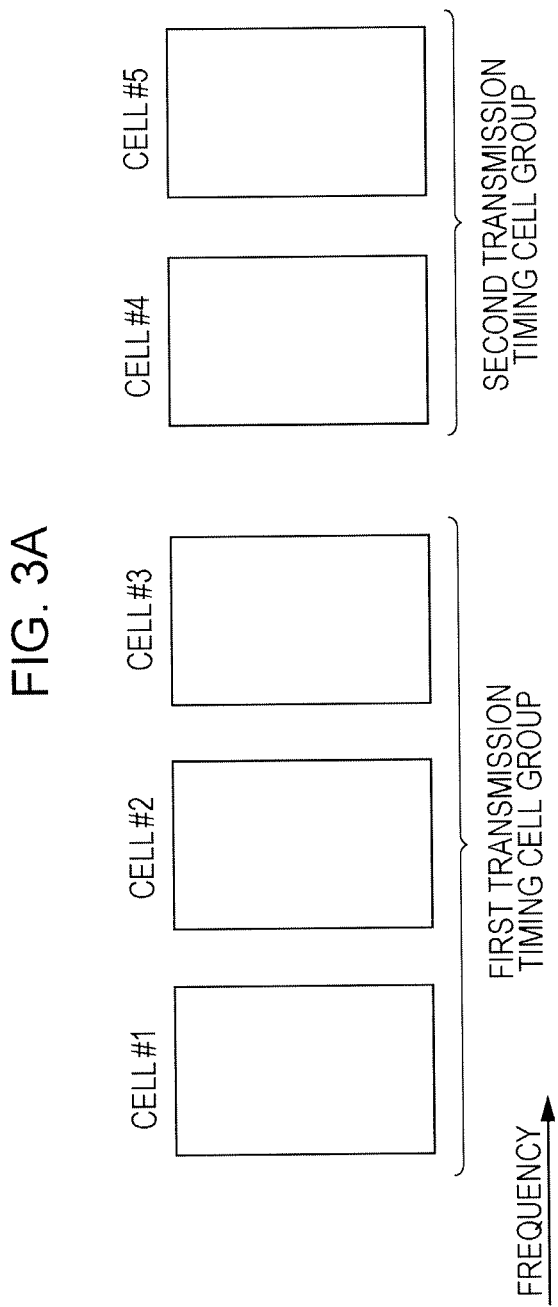

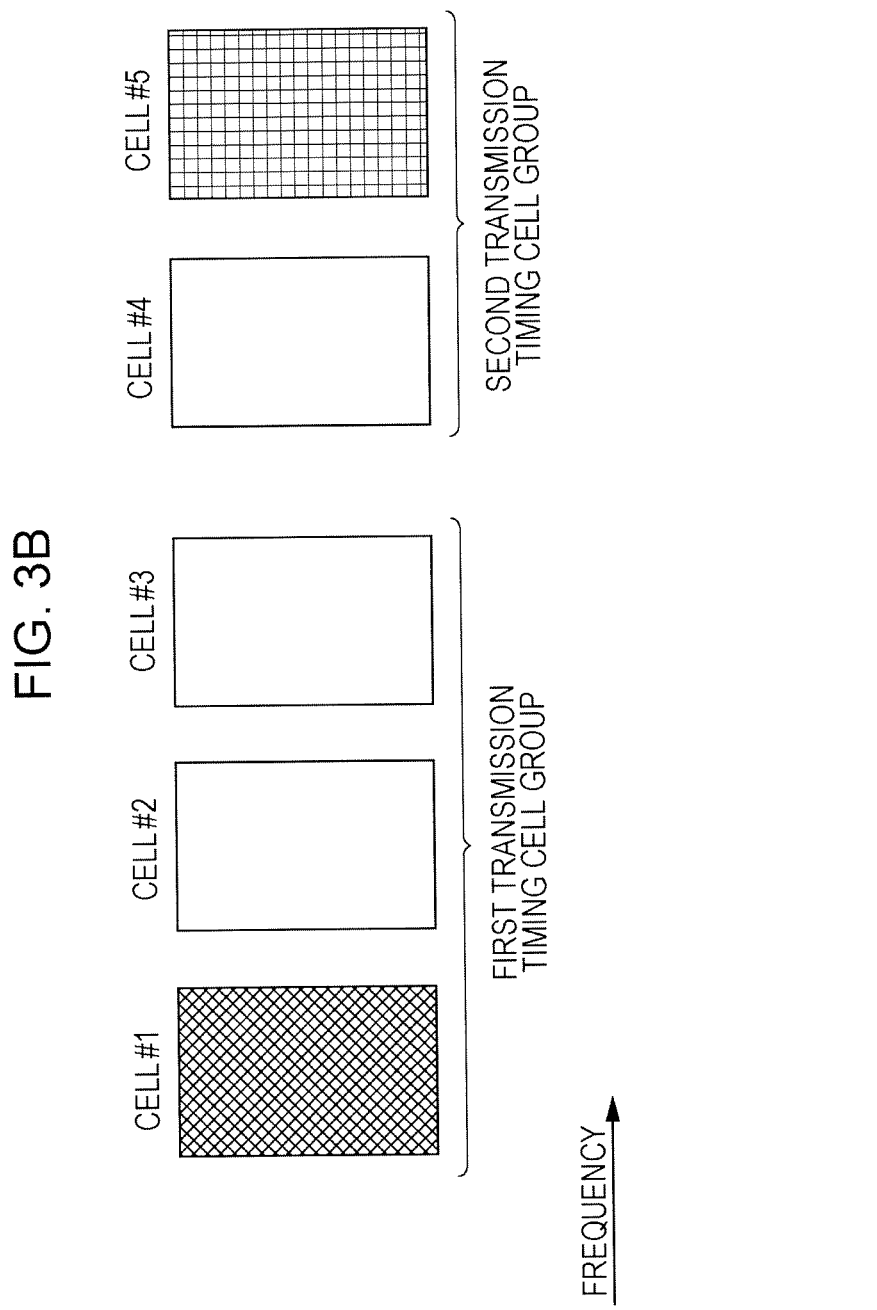

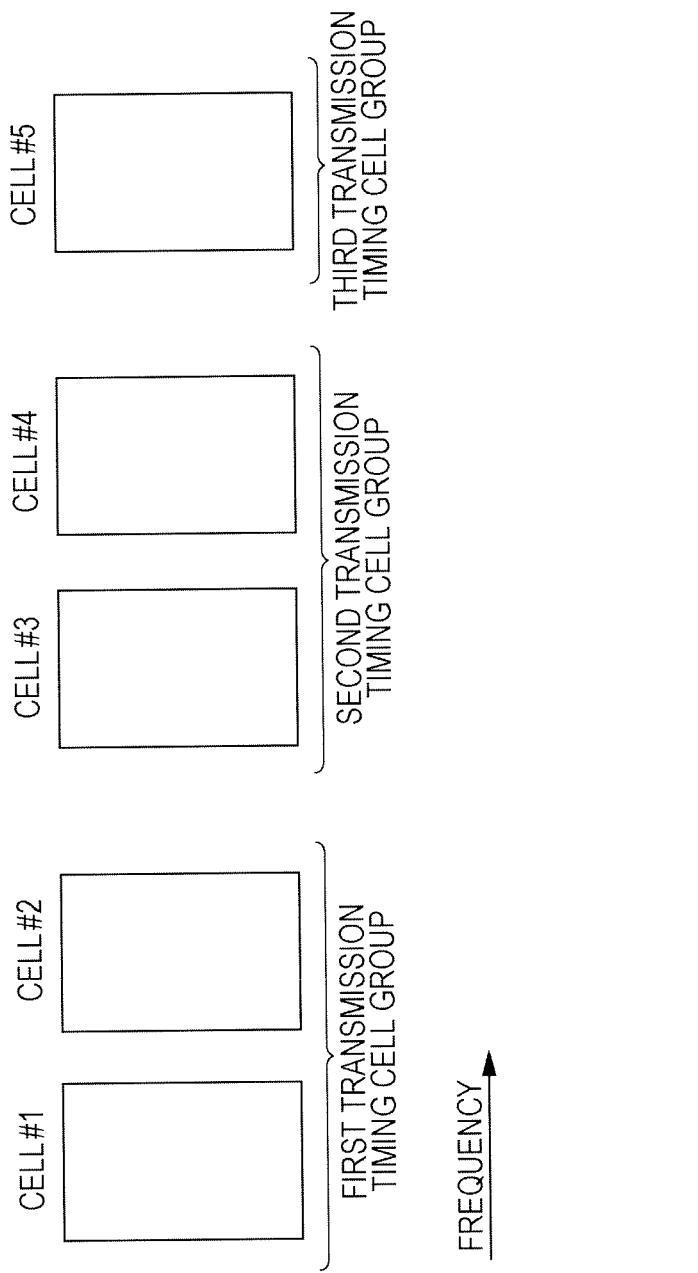

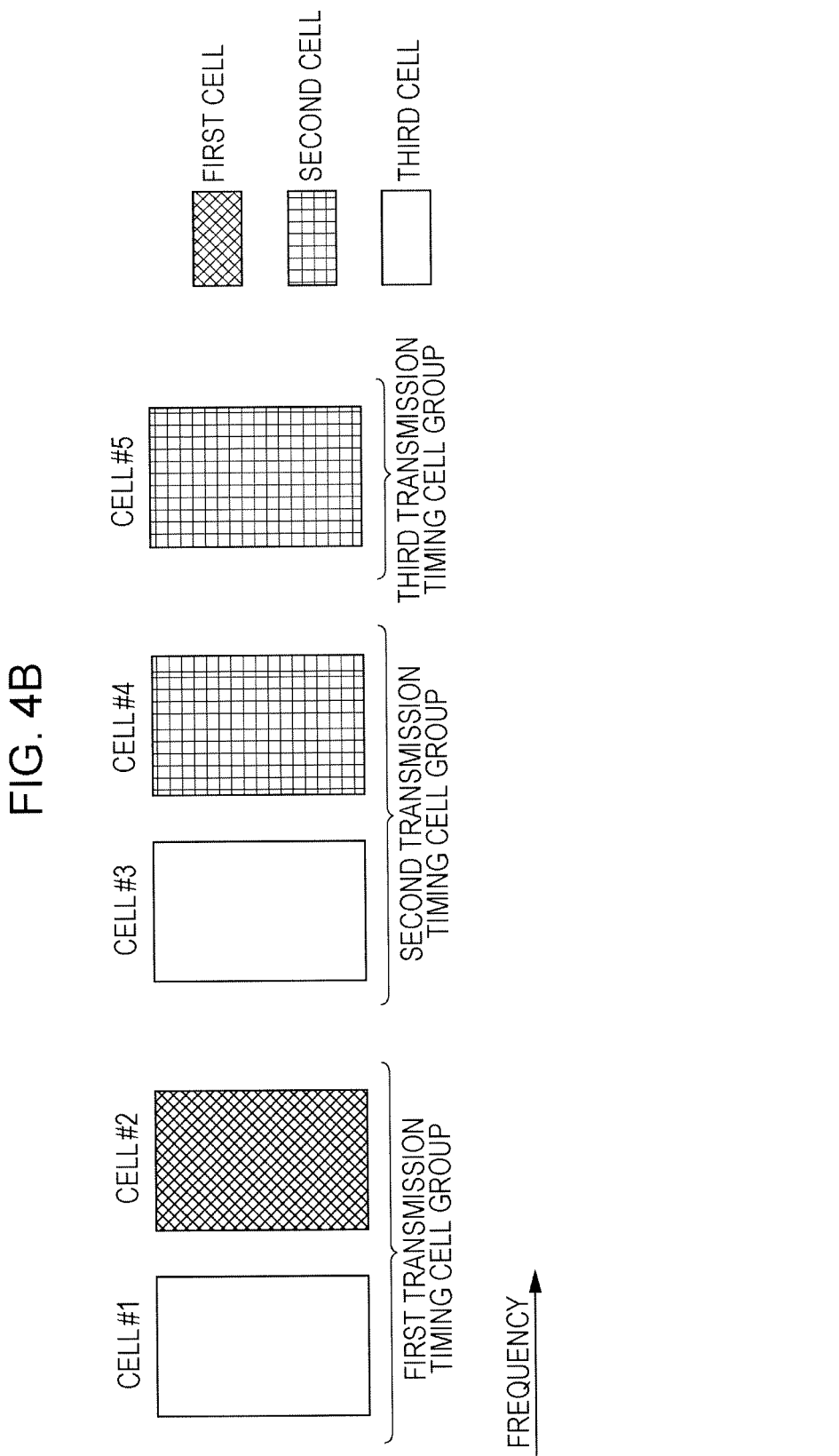

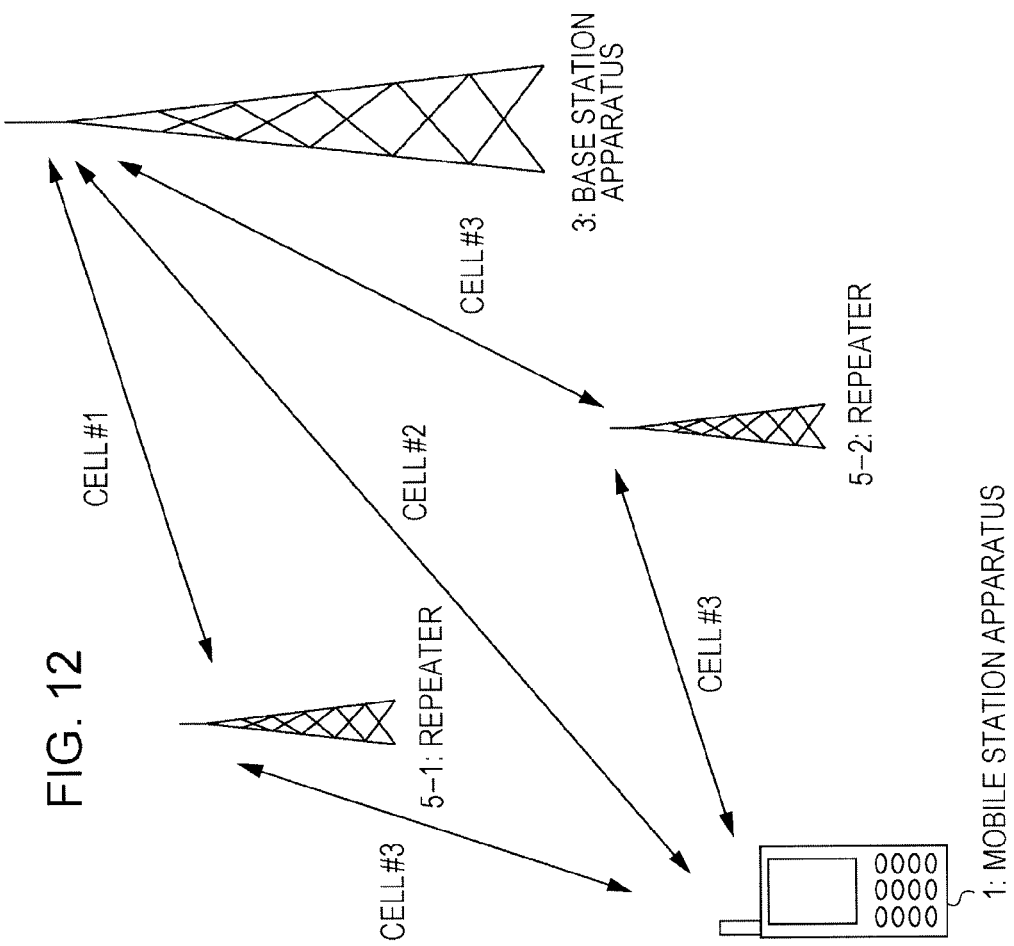

BASE STATION APPARATUS, MOBILE STATION APPARATUS, AND COMMUNICATION METHOD

CROSS-REFERENCE TO RELATED APPLICATIONS

This application is a Continuation application of co-pending application Ser. No. 14/754,004 filed Jun. 29, 2015, which is a Continuation of application Ser. No. 13/814,424 filed on Mar. 4, 2013 (Issued as U.S. Pat. No. 9,094,989 on Jul. 28, 2015), which is a National Phase of PCT International Application No. PCT/JP2011/066740 filed on Jul. 22, 2011, which claims priority under 35 U.S.C. § 119(a) to Japanese Patent Application No. 2010-177918 filed in Japan on Aug. 6, 2010. All of the above applications are hereby expressly incorporated by reference into the present application.

TECHNICAL FIELD

The present invention relates to a base station apparatus, a mobile station apparatus, a mobile communication system, a communication method, a control program, and an integrated circuit that are used for efficiently executing random access.

BACKGROUND ART

In 3GPP (3rd Generation Partnership Project), the W-CDMA scheme has been standardized as a 3rd generation cellular mobile communication scheme, and the services thereof have sequentially been available. Also, HSDPA with higher communication speed has been standardized, and the services thereof have been available.

Also, in 3GPP, standardization of evolved 3rd generation radio access (Evolved Universal Terrestrial Radio Access, hereinafter referred to as "EUTRA") is progressing. As a downlink communication scheme of EUTRA, the OFDM (Orthogonal Frequency Division Multiplexing) scheme, which is resistant to multipath interference and is suitable for high-speed transmission, is employed. As an uplink communication scheme, the DFT (Discrete Fourier Transform)-spread OFDM scheme of the SC-FDMA (Single Carrier-Frequency Division Multiple Access) scheme, in which the PAPR (Peak to Average Power Ratio) of a transmission signal can be decreased, is employed in view of the cost and power consumption of mobile station apparatuses.

In 3GPP, discussions over Advanced-EUTRA, which is a further development of EUTRA, have begun. Advanced-EUTRA is based on the assumption that a band with a bandwidth of up to 100 MHz is used in each of uplink and downlink, and that communication is performed at transmission rates of up to 1 Gbps or more in downlink and up to 500 Mbps or more in uplink.

Advanced-EUTRA is directed to realizing a 100 MHz band at a maximum by combining a plurality of EUTRA bands, each having a bandwidth of 20 MHz or less, so as to be compatible with EUTRA mobile station apparatuses. In Advanced-EUTRA, each EUTRA band of 20 MHz or less is called a component carrier (CC) (NPL 3). A combination of one downlink component carrier and one uplink component carrier constitutes one cell. Also, only one downlink component carrier may constitute one cell.

CITATION LIST

Non Patent Literature

NPL 1: 3GPP TS (Technical Specification) 36.300, V9.30 (2010-03), Evolved Universal Terrestrial Radio Access (E-UTRA) and Evolved Universal Terrestrial Radio Access Network (E-UTRAN), Overall description Stage 2

NPL 2: 3GPP TS (Technical Specification) 36.321, V9.20 (2010-03), Evolved Universal Terrestrial Radio Access (E-UTRA) Medium Access Control (MAC) protocol specification NPL 3: 3GPP TS (Technical Report) 36.814, V9.00 (2010-03), Evolved Universal Terrestrial Radio Access (E-UTRA) Further advancements for E-UTRA physical layer aspects

SUMMARY OF INVENTION

Technical Problem

In a case where a mobile station apparatus communicates with a base station apparatus by using a plurality of cells, the mobile station apparatus may connect to the base station apparatus via a repeater or the like. In such a case, the reception timing of each downlink component carrier in the mobile station apparatus may vary among individual cells. Furthermore, a transmission timing for the base station apparatus may vary among individual uplink component carriers of individual cells. Thus, it is necessary to adjust transmission timings in individual uplink component carriers of individual cells.

However, in a case where it is necessary to adjust transmission timings in individual cells, if uplink synchronization is lost, such as at the time of initial access or handover, random access processing is necessary for individual cells. In a case where each mobile station apparatus is allocated with a plurality of cells and where a plurality of random access processing operations are simultaneously executed in the individual cells, the processing executed in the mobile station apparatus becomes complicated. In addition, since each mobile station apparatus executes a plurality of random access processing operations, collisions of random access preambles among the mobile station apparatuses increase.

The present invention has been made in view of these circumstances, and an object of the invention is to provide a base station apparatus, a mobile station apparatus, a mobile communication system, a communication method, a control program, and an integrated circuit that enable efficient random access in a case where transmission timings on the side of mobile station apparatuses vary among individual cells.

Solution to Problem (1) In order to achieve the above-described object, an embodiment of the present invention takes the following measures. That is, a base station apparatus of an embodiment of the present invention is a base station apparatus applied to a mobile communication system in which random access from a mobile station apparatus to a base station apparatus is executed. The base station apparatus allocates a plurality of cells to the mobile station apparatus, groups the cells into groups in each of which cells have an identical transmission timing in the mobile station apparatus, notifies the mobile station apparatus of transmission timings determined for the individual groups, permits the mobile station apparatus to execute random access using any one of the cells included in the groups, and notifies the mobile station apparatus of random access execution information about the cell for which random access is permitted.

(2) The base station apparatus of an embodiment of the present invention permits both of contention based random access and non-contention based random access, or only non-contention based random access for the cell for which random access is permitted.

(3) The base station apparatus of an embodiment of the present invention permits both of contention based random access and non-contention based random access for any one of the cells for which random access is permitted, and permits non-contention based random access for another one of the cells for which random access is permitted.

(4) In a case where the cell for which random access is permitted is changed, the base station apparatus of an embodiment of the present invention notifies the mobile station apparatus of random access execution information about a cell for which random access is newly permitted.

(5) A base station apparatus of an embodiment of the present invention is a base station apparatus applied to a mobile communication system in which random access from a mobile station apparatus to a base station apparatus is executed. The base station apparatus allocates a plurality of cells to the mobile station apparatus, groups the cells into groups in each of which cells have an identical transmission timing in the mobile station apparatus, and notifies the mobile station apparatus of transmission timings determined for the individual groups. Also, the base station apparatus sets, for the mobile station apparatus, any one of the cells included in any one of the groups as a first cell, any one of the cells included in another one of the groups as a second cell, and cells other than the first cell and the second cell as third cells, and notifies the mobile station apparatus of system information and setting information about the cells.

(6) In the base station apparatus of an embodiment of the present invention, system information about the first cell and the second cell includes random access execution information, and system information about the third cells does not include random access execution information.

(7) The base station apparatus of an embodiment of the present invention permits contention based random access and non-contention based random access for the first cell, and permits non-contention based random access for the second cell.

(8) A mobile station apparatus of an embodiment of the present invention is a mobile station apparatus applied to a mobile communication system in which random access from a mobile station apparatus to a base station apparatus is executed. The mobile station apparatus receives, from the base station apparatus, allocation information about a plurality of cells, information about grouping of the cells into groups in each of which cells have an identical transmission timing, and random access execution information about one cell in each of the groups, and transmits a random access preamble for only a cell to which the random access execution information is set.

(9) In a case where the mobile station apparatus of an embodiment of the present invention newly receives random access execution information from the base station apparatus after the cell for which random access is permitted has been changed by the base station apparatus, the mobile station apparatus discards random access execution information that has already been obtained.

(10) In a case where the number of transmissions of a random access preamble for the cell for which both of contention based random access and non-contention based random access are permitted by the base station apparatus exceeds a maximum number of retransmissions, the mobile station apparatus of an embodiment of the present invention determines that random access has failed, and, in a case where the number of transmissions of a random access preamble for the cell for which only non-contention based random access is permitted exceeds the maximum number of retransmissions, the mobile station apparatus determines that random access has not failed.

(11) In a case where the mobile station apparatus of an embodiment of the present invention receives random access instruction information about the cell for which only non-contention based random access is permitted by the base station apparatus and where the random access instruction information indicates contention based random access, the mobile station apparatus discards the received random access instruction information.

(12) In a case where the mobile station apparatus of an embodiment of the present invention receives random access instruction information about a cell other than the cell for which random access is permitted by the base station apparatus, the mobile station apparatus discards the received random access instruction information.

(13) A mobile station apparatus of an embodiment of the present invention is a mobile station apparatus applied to a mobile communication system in which random access from a mobile station apparatus to a base station apparatus is executed. In the base station apparatus, cells are grouped into groups in each of which cells have an identical transmission timing, any one of the cells included in any one of the groups is set as a first cell, any one of the cells included in another one of the groups is set as a second cell, cells other than the first cell and the second cell are set as third cells, and the mobile station apparatus receives system information and setting information about the cells from the base station apparatus, and sets, for the individual cells, the received system information and setting information about the cells.

(14) The mobile station apparatus of an embodiment of the present invention transmits a random access preamble only for the first cell and the second cell.

(15) In a case where the mobile station apparatus of an embodiment of the present invention receives change instruction information for changing the first cell or the second cell from the base station apparatus, the mobile station apparatus discards random access execution information about the first cell before change or the second cell before change.

(16) In a case where the number of transmissions of a random access preamble for the second cell exceeds a maximum number of retransmissions, the mobile station apparatus of an embodiment of the present invention determines that random access has not failed.

(17) In a case where the mobile station apparatus of an embodiment of the present invention receives random access instruction information about the second cell from the base station apparatus and where the received random access instruction information indicates contention based random access, the mobile station apparatus discards the received random access instruction information.

(18) In a case where the mobile station apparatus of an embodiment of the present invention receives random access instruction information about the third cells from the base station apparatus, the mobile station apparatus discards the received random access instruction information.

(19) A mobile communication system of an embodiment of the present invention includes the base station apparatus according to (1) and the mobile station apparatus according to (8), or the base station apparatus according to (5) and the mobile station apparatus according to (13).

(20) A communication method of an embodiment of the present invention is a communication method for a base station apparatus applied to a mobile communication system in which random access from a mobile station apparatus to a base station apparatus is executed. The communication method includes allocating a plurality of cells to the mobile station apparatus, grouping the cells into groups in each of which cells have an identical transmission timing in the mobile station apparatus, notifying the mobile station apparatus of transmission timings determined for the individual groups, permitting the mobile station apparatus to execute random access using any one of the cells included in the groups, and notifying the mobile station apparatus of random access execution information about the cell for which random access is permitted.

(21) A communication method of an embodiment of the present invention is a communication method for a base station apparatus applied to a mobile communication system in which random access from a mobile station apparatus to a base station apparatus is executed. The communication method includes allocating a plurality of cells to the mobile station apparatus, grouping the cells into groups in each of which cells have an identical transmission timing in the mobile station apparatus, notifying the mobile station apparatus of transmission timings determined for the individual groups, setting, for the mobile station apparatus, any one of the cells included in any one of the groups as a first cell, any one of the cells included in another one of the groups as a second cell, and cells other than the first cell and the second cell as third cells, and notifying the mobile station apparatus of system information and setting information about the cells.

(22) A control program of an embodiment of the present invention is a control program for a base station apparatus applied to a mobile communication system in which random access from a mobile station apparatus to a base station apparatus is executed. The control program includes commands to cause a computer to be able to read and execute a series of processes. The series of processes include a process of allocating a plurality of cells to the mobile station apparatus, a process of grouping the cells into groups in each of which cells have an identical transmission timing in the mobile station apparatus, and notifying the mobile station apparatus of transmission timings determined for the individual groups, and a process of permitting the mobile station apparatus to execute random access using any one of the cells included in the groups, and notifying the mobile station apparatus of random access execution information about the cell for which random access is permitted.

(23) A control program of an embodiment of the present invention is a control program for a base station apparatus applied to a mobile communication system in which random access from a mobile station apparatus to a base station apparatus is executed. The control program includes commands to cause a computer to be able to read and execute a series of processes. The series of processes include a process of allocating a plurality of cells to the mobile station apparatus, a process of grouping the cells into groups in each of which cells have an identical transmission timing in the mobile station apparatus, and notifying the mobile station apparatus of transmission timings determined for the individual groups, a process of setting, for the mobile station apparatus, any one of the cells included in any one of the groups as a first cell, a process of setting any one of the cells included in another one of the groups as a second cell, a process of setting cells other than the first cell and the second cell as third cells, and a process of notifying the mobile station apparatus of system information and setting information about the cells.

(24) An integrated circuit of an embodiment of the present invention is an integrated circuit that is mounted in a base station apparatus to cause the base station apparatus to implement a plurality of functions. The integrated circuit causes the base station apparatus to implement a series of functions. The series of functions includes a function of allocating a plurality of cells to the mobile station apparatus, a function of grouping the cells into groups in each of which cells have an identical transmission timing in the mobile station apparatus, and notifying the mobile station apparatus of transmission timings determined for the individual groups, and a function of permitting the mobile station apparatus to execute random access using any one of the cells included in the groups, and notifying the mobile station apparatus of random access execution information about the cell for which random access is permitted.

(25) An integrated circuit of an embodiment of the present invention is an integrated circuit that is mounted in a base station apparatus to cause the base station apparatus to implement a plurality of functions. The integrated circuit causes the base station apparatus to implement a series of functions. The series of functions includes a function of allocating a plurality of cells to the mobile station apparatus, a function of grouping the cells into groups in each of which cells have an identical transmission timing in the mobile station apparatus, and notifying the mobile station apparatus of transmission timings determined for the individual groups, a function of setting, for the mobile station apparatus, any one of the cells included in any one of the groups as a first cell, a function of setting any one of the cells included in another one of the groups as a second cell, a function of setting cells other than the first cell and the second cell as third cells, and a function of notifying the mobile station apparatus of system information and setting information about the cells.

Advantageous Effects of Invention

According to the present invention, unnecessary random access processing does not occur even in a case where a plurality of component carriers are allocated to one mobile station apparatus in an Advanced-EUTRA system. This enables efficient random access.

BRIEF DESCRIPTION OF DRAWINGS

FIG. 3A is a diagram illustrating an example configuration of cells according to the first embodiment of the present invention.

FIG. 3B is a diagram illustrating an example configuration of cells according to the first embodiment of the present invention.

FIG. 4A is a diagram illustrating an example configuration of cells according to a second embodiment of the present invention.

FIG. 4B is a diagram illustrating an example configuration of cells according to the second embodiment of the present invention.

FIG. 12 is a diagram illustrating an example in which a base station apparatus and a mobile station apparatus communicate with each other via repeaters.

DESCRIPTION OF EMBODIMENTS

Hereinafter, embodiments of the present invention will be described with reference to the drawings. The downlink of EUTRA is constituted by a downlink pilot channel DPiCH, a downlink synchronization channel DSCH, a physical downlink shared channel PDSCH, a physical downlink control channel PDCCH, and a physical broadcast channel PBCH.

The uplink of EUTRA is constituted by an uplink pilot channel UPiCH, a random access channel RACH, a physical uplink shared channel PUSCH, and a physical uplink control channel PUCCH.

Figure 5:
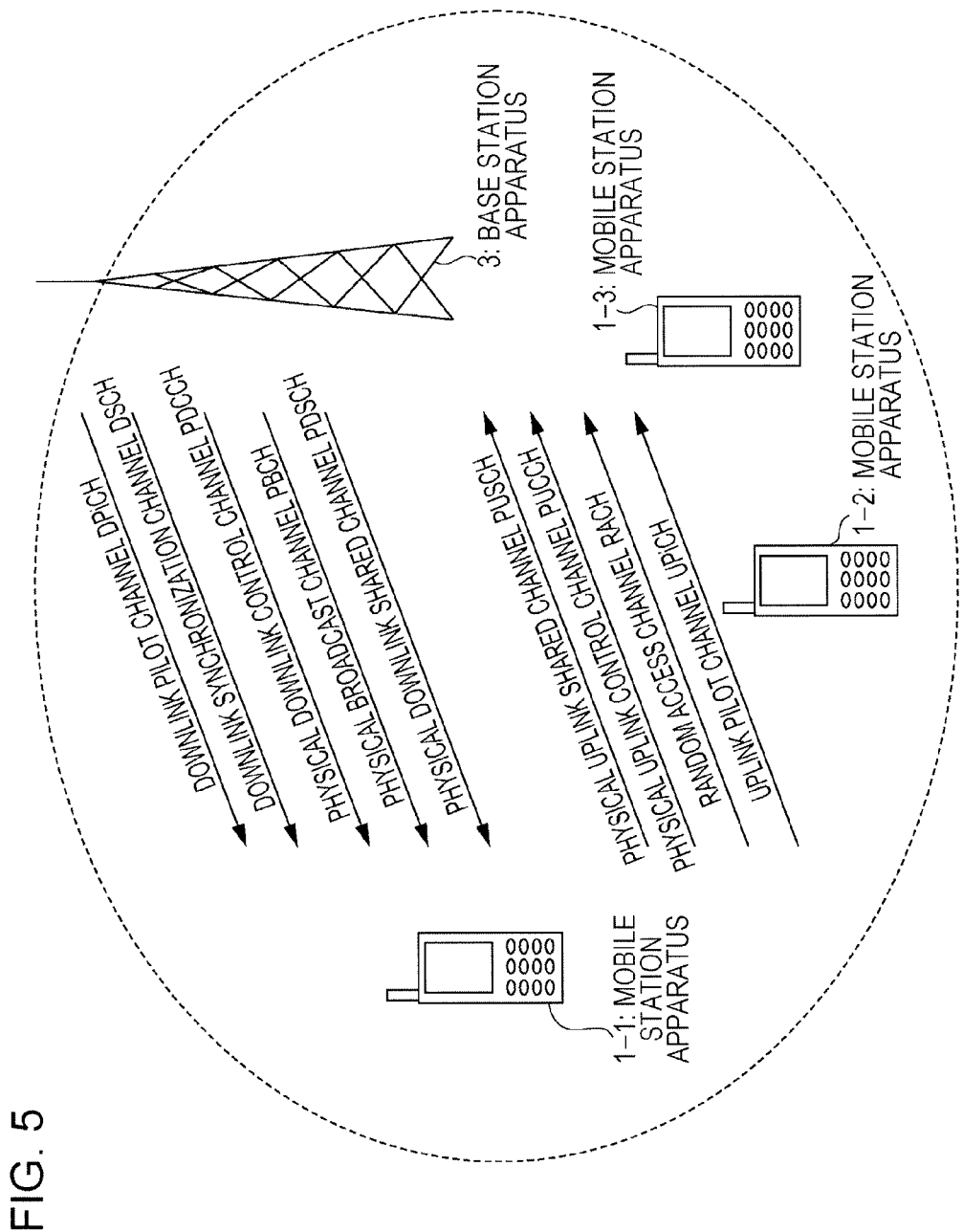
FIG. 5 is a diagram illustrating a channel configuration in EUTRA.
Figure 6:
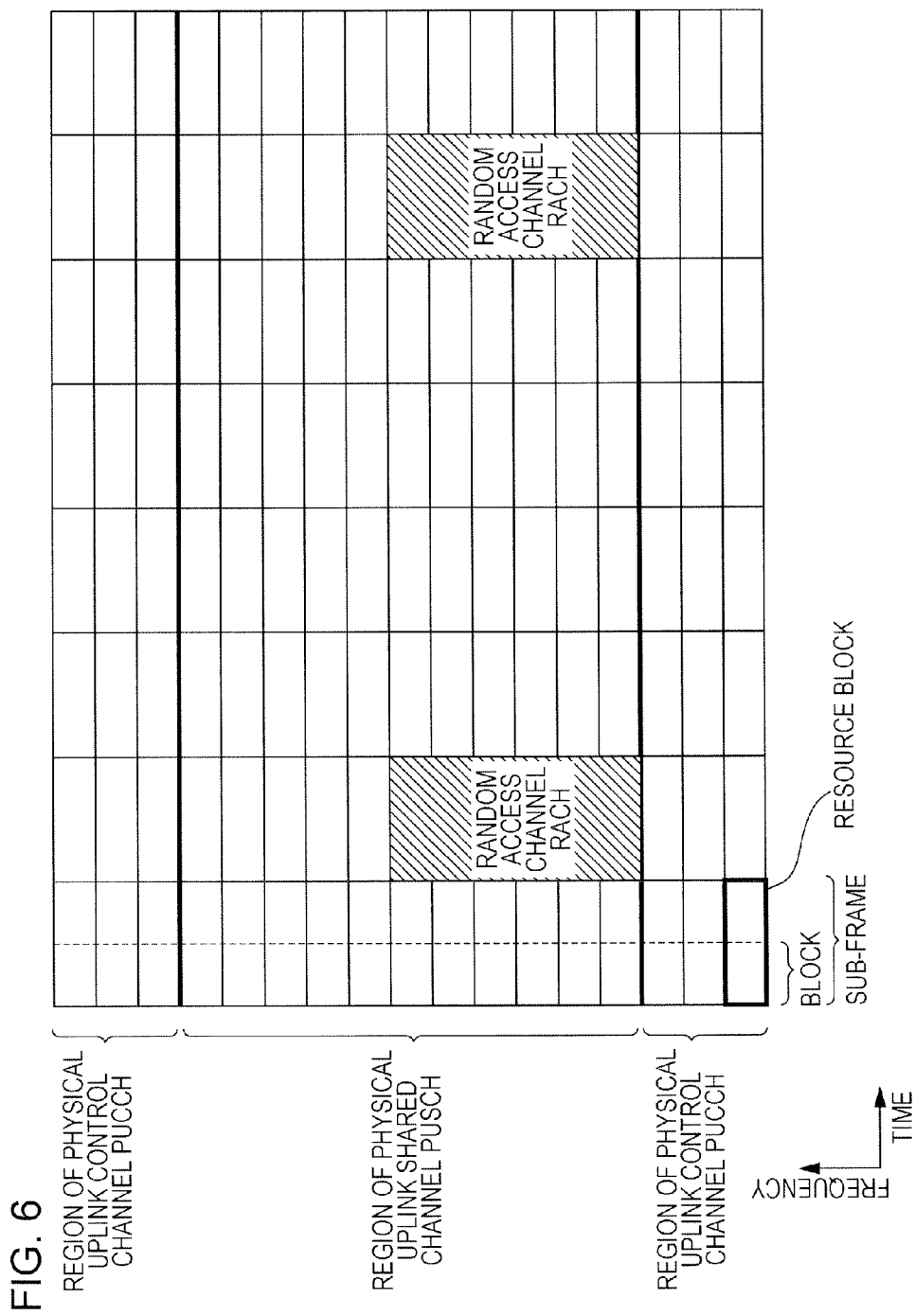
FIG. 6 is a diagram illustrating the configuration of uplink in EUTRA.

FIG. 5 is a diagram illustrating a channel configuration in EUTRA, and FIG. 6 is a diagram illustrating the configuration of uplink in EUTRA. One block is constituted by twelve sub-carriers and seven OFDM symbols. Two blocks constitute one resource block. Regarding the random access channel RACH, one random access channel is provided in one sub-frame, so that accesses from many mobile station apparatuses, for example, mobile station apparatuses 1-1 to 1-3 (hereinafter the mobile station apparatuses 1-1 to 1-3 are collectively referred to as mobile station apparatuses 1), can be dealt with.

The arrangement configuration (frequency positions and time positions) of random access channels RACH is notified from a base station apparatus 3 to the mobile station apparatuses 1, as a part of system information about the base station apparatus 3. The random access channels RACH are arranged at certain intervals. The random access channels RACH, the region of the physical uplink shared channel PUSCH, and the region of the physical uplink control channel PUCCH are separated as illustrated in FIG. 6. One random access channel RACH is constituted by using six resource blocks. The random access channel is used for, in uplink, achieving uplink synchronization between the mobile station apparatus 1 and the base station apparatus 3 (adjusting a timing of transmission from the mobile station apparatus 1 to the base station apparatus 3).

A random access procedure has two variants, namely contention based random access and non-contention based random access (NPL 1).

Figure 7:
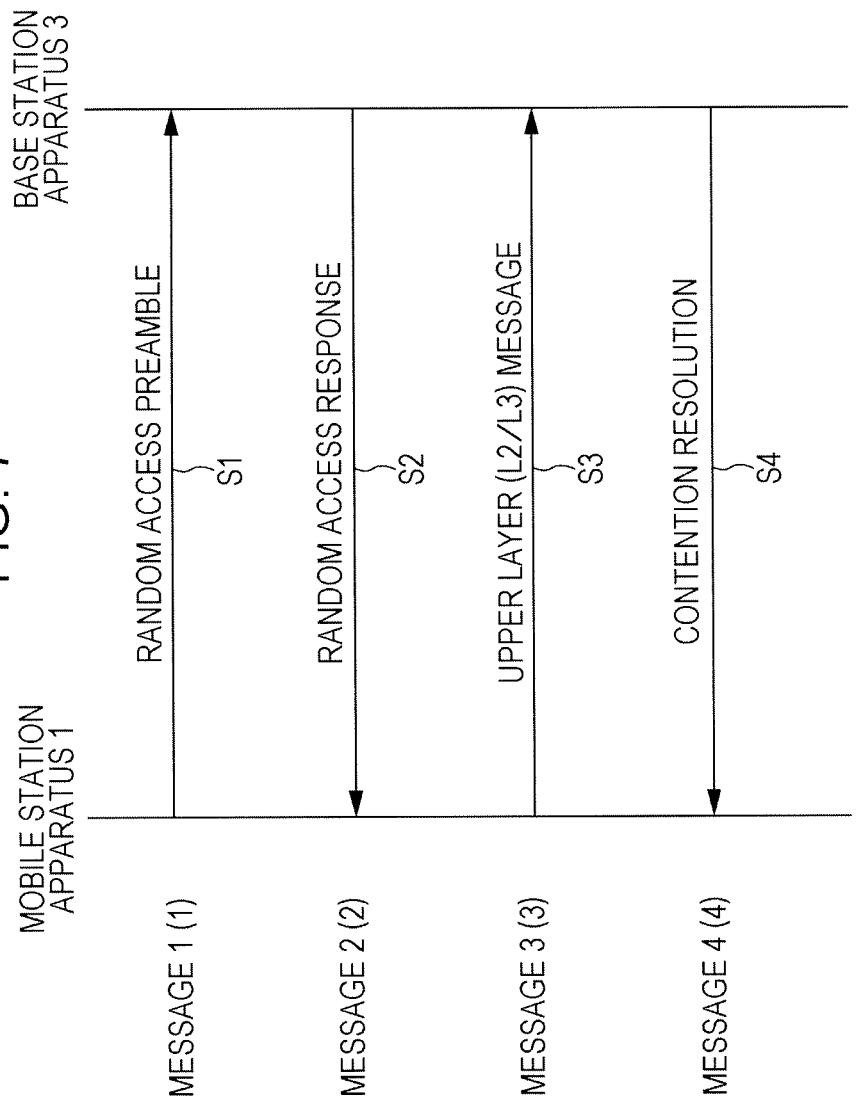
FIG. 7 is a sequence chart illustrating a contention based random access procedure.

FIG. 7 is a diagram illustrating a procedure of contention based random access. Contention based random access is random access in which collision is likely to occur among the mobile station apparatuses 1. Contention based random access is performed, for example, at the time of initial access in a state where connection to (communication with) the base station apparatus 3 has not been established, or at the time of sending a scheduling request when uplink data transmission occurs in the mobile station apparatus 1 in a state where connection to the base station apparatus 3 has been established but uplink synchronization is lost.

Figure 8:
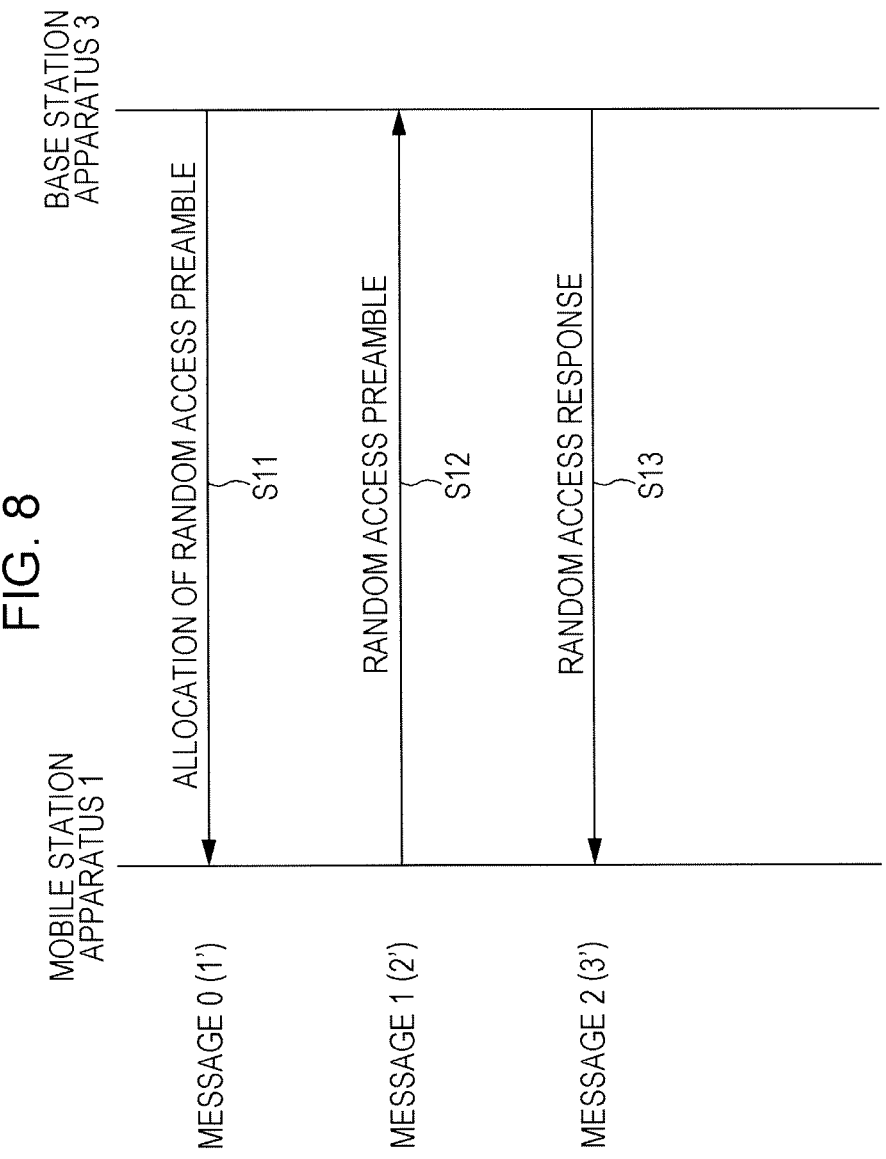
FIG. 8 is a sequence chart illustrating a non-contention based random access procedure.

FIG. 8 is a diagram illustrating a procedure of non-contention based random access. Non-contention based random access is random access in which collision does not occur among the mobile station apparatuses 1. In non-contention based random access, the mobile station apparatus 1 starts random access in response to an instruction from the base station apparatus 3 in a special case, for example, at the time of handover or in a case where the transmission timing of the mobile station apparatus 1 is not valid, in order to quickly achieve uplink synchronization between the mobile station apparatus 1 and the base station apparatus 3 when the connection between the base station apparatus 3 and the mobile station apparatus 1 has been established but uplink synchronization therebetween is lost (NPL 1). Non-contention based random access is instructed by a message of an RRC layer (Radio Resource Control: Layer 3) and control data of the physical downlink control channel PDCCH.

In the case of accessing a random access channel RACH, the mobile station apparatus 1 transmits only a random access preamble. The random access preamble is constituted by a preamble portion and a CP (Cyclic prefix) portion. In the preamble portion, a CAZAC (Constant Amplitude Zero Auto-Correlation Zone Code) sequence serving as a signal pattern representing information is used. Sixty-four types of sequences are prepared and six-bit information is expressed.

Figure 9:
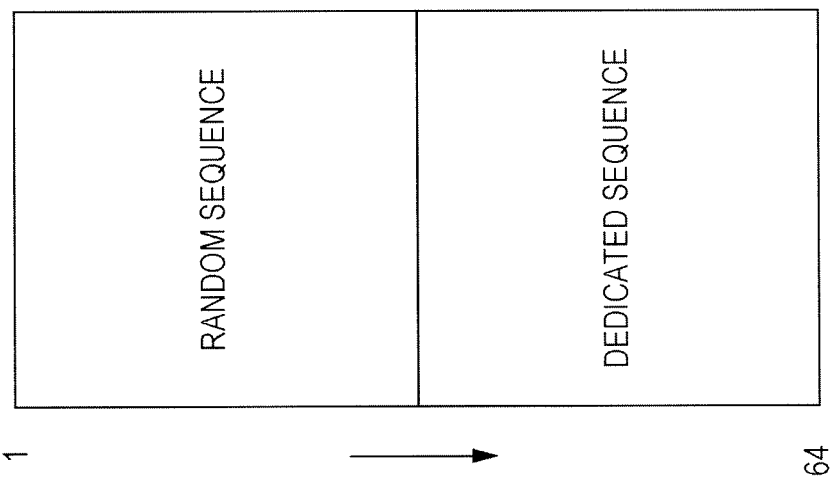
FIG. 9 is a diagram illustrating an example of a sequence group in EUTRA.

As illustrated in FIG. 9, CAZAC sequences used for a random access preamble are roughly classified into a sequence used for contention based random access (random sequence or random preamble) and a sequence used for non-contention based random access (dedicated sequence or dedicated preamble). Information about generation of the random access preamble is notified as system information from the base station apparatus 3 to the mobile station apparatus 1. Also, random access information included in the system information notified from the base station apparatus 3 includes information about the maximum number of transmissions of a random access preamble and the transmission power for the random access preamble.

A contention based random access procedure will be briefly described with reference to FIG. 7. First, a mobile station apparatus 1 among the mobile station apparatuses 1 transmits a random access preamble to the base station apparatus 3 (message 1 (1), step S1). Then, the base station apparatus 3 receives the random access preamble and transmits a response to the random access preamble (random access response) to the mobile station apparatus 1 (message 2 (2), step S2). The mobile station apparatus 1 transmits a message of an upper layer (Layer 2/Layer 3) on the basis of scheduling information included in the random access response (message 3 (3), step S3). The base station apparatus 3 transmits a collision confirmation message to the mobile station apparatus 1 which has received the upper layer message of (3) (message 4 (4), step S4). Note that contention based random access is also referred to as random preamble transmission.

A non-contention based random access procedure will be briefly described with reference to FIG. 8. First, the base station apparatus 3 notifies the mobile station apparatus 1 of a preamble number (or a sequence number) and a random access channel number to be used (message 0 (1'), step S11). The mobile station apparatus 1 transmits a random access preamble of the specified preamble number to the specified random access channel RACH (message 1 (2'), step S12). Then, the base station apparatus 3 receives the random access preamble and transmits a response to the random access preamble (random access response) to the mobile station apparatus 1 (message 2 (3'), step S13). If the value of the notified preamble number is 0, contention based random access is performed. Note that non-contention based random access is also referred to as dedicated preamble transmission.

Referring to FIG. 7, the contention based random access procedure will be described in detail. First, the mobile station apparatus 1 selects one random sequence from a random sequence group on the basis of a downlink radio channel condition (path-loss) and the size of message 3, generates a random access preamble on the basis of the selected random sequence, and transmits the random access preamble by using a random access channel RACH (message 1 (1)).

The base station apparatus 3 detects the random access preamble transmitted from the mobile station apparatus 1, and then calculates an amount of difference in transmission timing between the mobile station apparatus 1 and the base station apparatus 3 by using the random access preamble, performs scheduling for transmitting an L2/L3 message (specifies the position of an uplink radio resource and a transmission format (message size)), allocates Temporary C-RNTI (Cell-Radio Network Temporary Identity: mobile station apparatus identification information), arranges RA-RNTI, which represents a response (random access response) addressed to the mobile station apparatus 1 which has transmitted the random access preamble using the random access channel RACH, to the physical downlink control channel PDCCH, and transmits the random access response, which includes transmission timing information, scheduling information, Temporary C-RNTI, and the preamble number (sequence number) of the received preamble, to the physical downlink shared channel PDSCH (message 2 (2)).

The mobile station apparatus 1 detects the RA-RNTI in the physical downlink control channel PDCCH, and then determines the content of the random access response message arranged in the physical downlink shared channel PDSCH. If the random access response message includes the preamble number corresponding to the transmitted random access preamble, the mobile station apparatus 1 adjusts the transmission timing in accordance with the transmission timing information, and transmits an L2/L3 message which includes information identifying the mobile station apparatus 1, such as C-RNTI (or Temporary C-RNTI) or IMSI (International Mobile Subscriber Identity), by using the scheduled radio resource and transmission format (message 3 (3)). After adjusting the transmission timing, the mobile station apparatus 1 starts a transmission timing timer in which the adjusted transmission timing is valid. The transmission timing becomes invalid when timeout occurs. While the transmission timing is valid, the mobile station apparatus 1 is capable of transmitting data to the base station apparatus 3. When the transmission timing is invalid, the mobile station apparatus 1 is capable of transmitting only a random access preamble.

The mobile station apparatus 1 waits for a random access response message from the base station apparatus 3 for a certain period. If the mobile station apparatus 1 does not receive a random access response message which includes the preamble number of the transmitted random access preamble, the mobile station apparatus 1 retransmits the random access preamble.

The base station apparatus 3 receives the L2/L3 message from the mobile station apparatus 1, and then transmits a collision confirmation (contention resolution) message for determining whether or not collision is being occurred among the mobile station apparatuses 1-1 to 1-3 to the mobile station apparatus 1 by using C-RNTI (or Temporary C-RNTI) or IMSI included in the received L2/L3 message (message 4 (4)).

If the mobile station apparatus 1 does not detect a random access response message which includes the preamble number corresponding to the transmitted random access preamble within a certain period, or fails to transmit the message 3, or does not detect identification information about the mobile station apparatus 1 itself in the collision confirmation message within a certain period, the mobile station apparatus 1 retransmits the random access preamble (message 1 (1)) (NPL 2). If the number of transmissions of the random access preamble exceeds the maximum number of transmissions of the random access preamble indicated by the system information, the mobile station apparatus 1 determines that random access has failed, and stops the communication with the base station apparatus 3. If the random access procedure has been successfully completed, transmission and reception of control data for establishing connection are performed between the base station apparatus 3 and the mobile station apparatus 1.

After the random access procedure, the transmission timing is updated in the following manner: the base station apparatus 3 measures the uplink pilot channel UPiCH transmitted from the mobile station apparatus 1, calculates timing information, and notifies the mobile station apparatus 1 of the calculated transmission timing.

In 3GPP, discussions over Advanced-EUTRA, which is a further development of EUTRA, have begun. Advanced-EUTRA is based on the assumption that a band with a bandwidth of up to 100 MHz is used in each of uplink and downlink, and that communication is performed at transmission rates of up to 1 Gbps or more in downlink and up to 500 Mbps or more in uplink.

Figure 10:
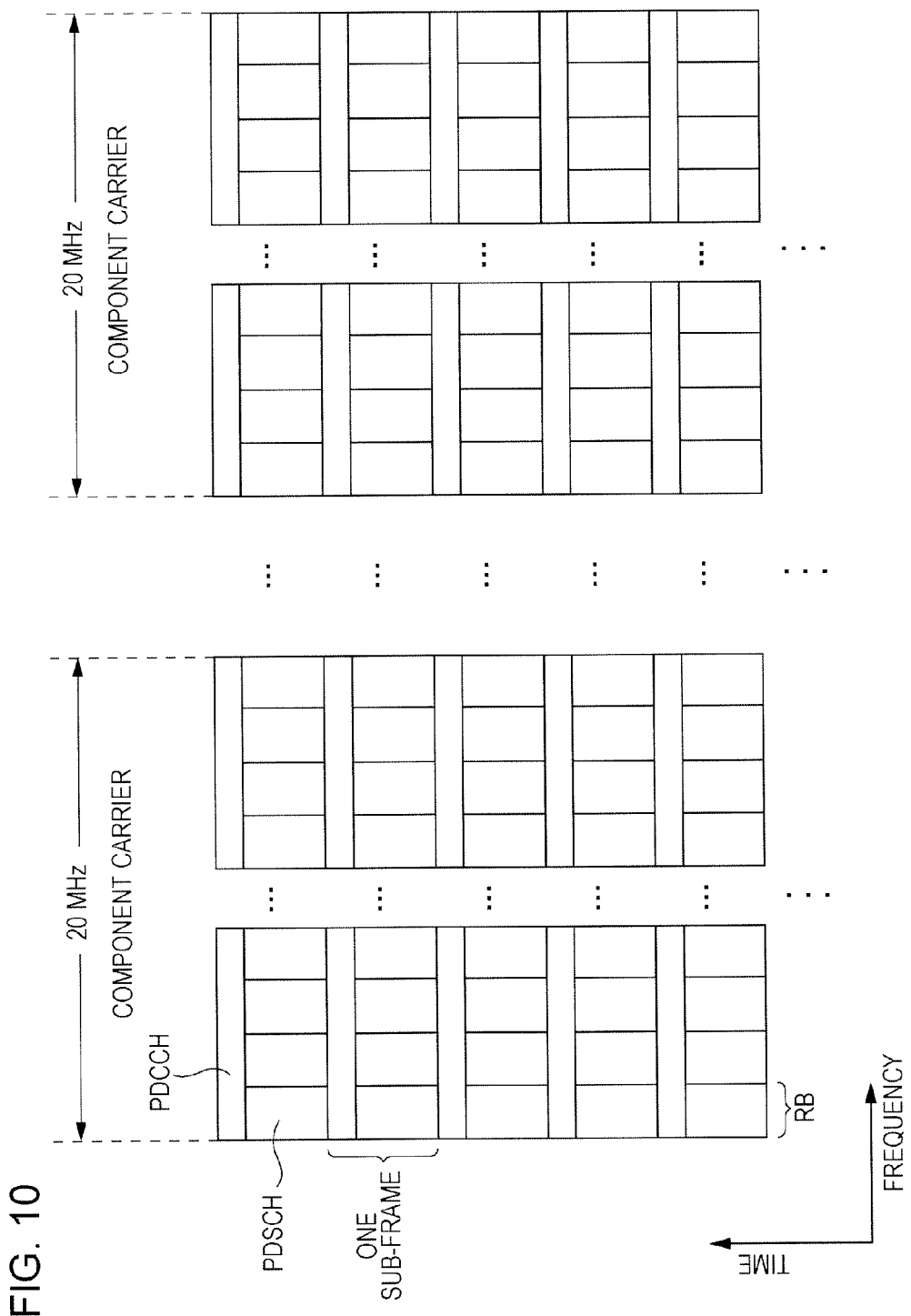
FIG. 10 is an explanatory diagram of downlink component carriers in Advanced-EUTRA.
Figure 11:
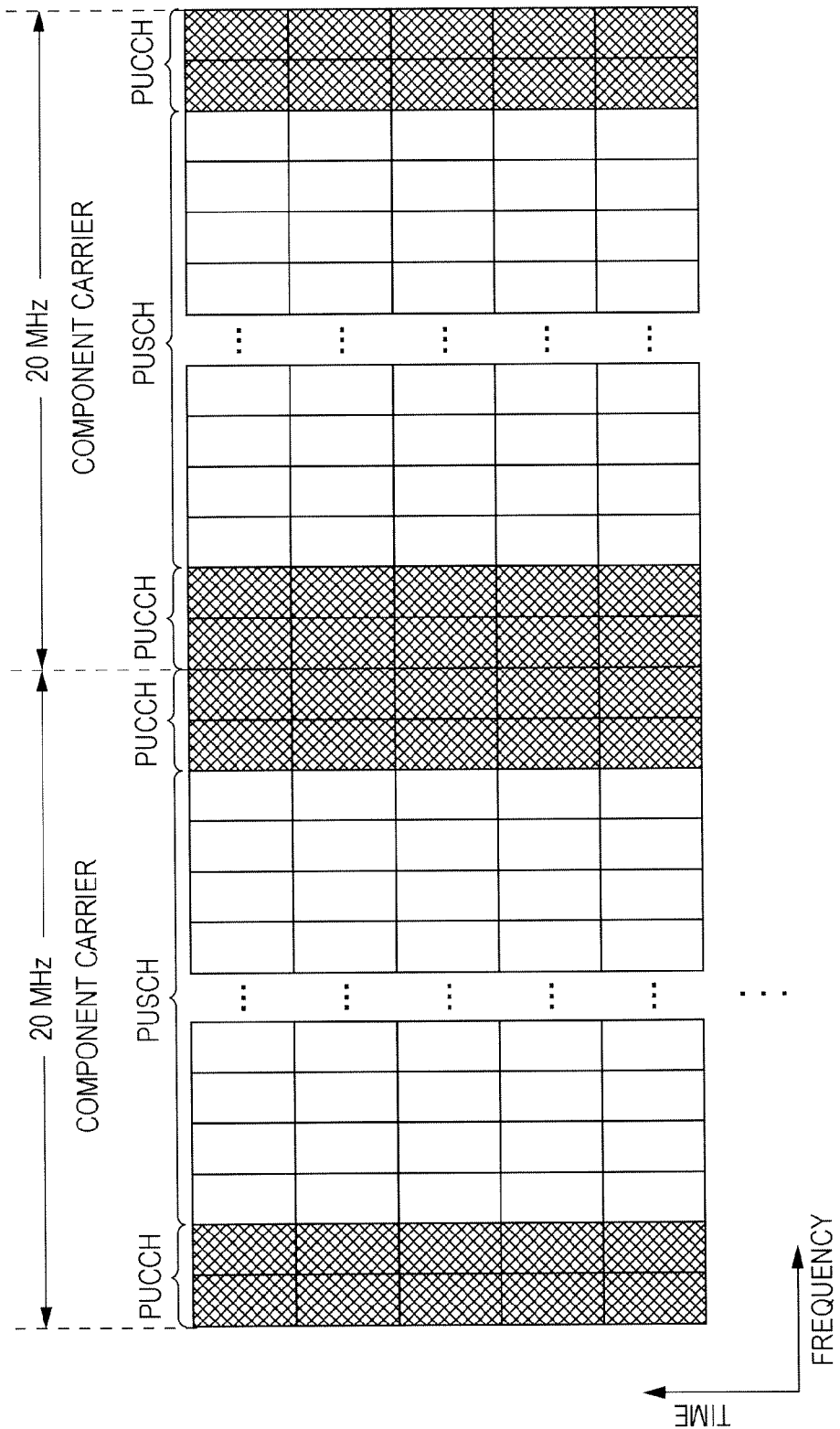
FIG. 11 is an explanatory diagram of uplink component carriers in Advanced-EUTRA.

FIG. 10 is an explanatory diagram of downlink component carriers in Advanced-EUTRA. FIG. 11 is an explanatory diagram of uplink component carriers in Advanced-EUTRA.

Advanced-EUTRA is directed to realizing a 100 MHz band at a maximum by combining a plurality of EUTRA bands, each having a bandwidth of 20 MHz or less, so as to be compatible with EUTRA mobile station apparatuses 1. In Advanced-EUTRA, each EUTRA band of 20 MHz or less is called a component carrier (CC) (NPL 3). A combination of one downlink component carrier and one uplink component carrier constitutes one cell. Also, only one downlink component carrier may constitute one cell.

The base station apparatus 3 allocates, among a plurality of cells, one or more cells suitable for the communication capacity and communication condition of the mobile station apparatus 1. The mobile station apparatus 1 transmits and receives data by using the allocated cell or cells. In a case where the mobile station apparatus 1 communicates with the base station apparatus 3 by using a plurality of cells, the mobile station apparatus 1 may connect to the base station apparatus 3 via a repeater or the like, as illustrated in FIG. 12. In such a case, the reception timing of each downlink component carrier in the mobile station apparatus 1 and/or the transmission timing of each uplink component carrier for the base station apparatus 3 may vary among individual cells. Particularly, if the transmission timing of each uplink component carrier for the base station apparatus 3 varies, it is necessary for the mobile station apparatus 1 to adjust transmission timings in individual uplink component carriers of individual cells.

First Embodiment

[Description of Configuration]

Figure 1:
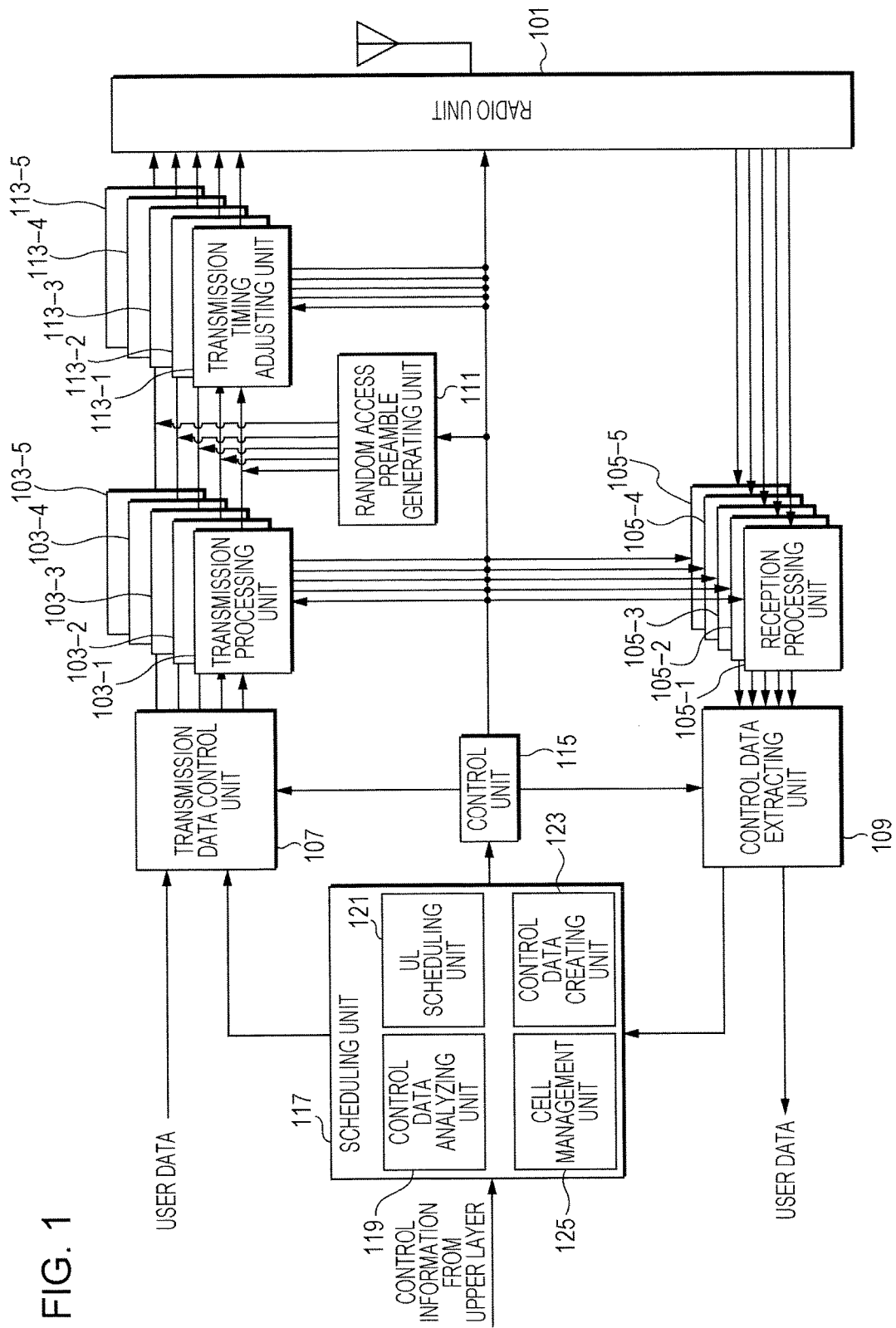
FIG. 1 is a block diagram illustrating the configuration of a mobile station apparatus according to a first embodiment of the present invention.

FIG. 1 is a diagram illustrating the configuration of the mobile station apparatus 1 according to an embodiment of the present invention. The mobile station apparatus 1 includes a radio unit 101, transmission processing units 103-1 to 103-5 (hereinafter, the transmission processing units 103-1 to 103-5 are collectively referred to as transmission processing units 103), reception processing units 105-1 to 105-5 (hereinafter, the reception processing units 105-1 to 105-5 are collectively referred to as reception processing units 105), a transmission data control unit 107, a control data extracting unit 109, a random access preamble generating unit 111, transmission timing adjusting units 113-1 to 113-5 (hereinafter, the transmission timing adjusting units 113-1 to 113-5 are collectively referred to as transmission timing adjusting units 113), a control unit 115, and a scheduling unit 117. The scheduling unit 117 includes a control data analyzing unit 119, a UL scheduling unit 121, a control data creating unit 123, and a cell management unit 125. In this embodiment, in order to describe an example in which the mobile station apparatus 1-1 is capable of receiving signals using five cells, five transmission processing units 103, five reception processing units 105, and five transmission timing adjusting units 113 are provided.

User data and control data are input to the transmission data control unit 107. The transmission data control unit 107 allocates individual pieces of data to individual channels of uplink component carriers of individual cells, and transmits the pieces of data to the transmission processing units 103-1 to 103-5, in response to an instruction from the control unit 115. The transmission processing units 103-1 to 103-5 modulate and encode the pieces of data received from the transmission data control unit 107, perform series/parallel conversion on input signals, perform DFT-IFFT (Inverse Fast Fourier Transform), and also perform OFDM signal processing such as insertion of CP, thereby generating OFDM signals. The transmission timing adjusting units 113-1 to 113-5 adjust transmission timings of signals to be output using individual uplink component carriers of individual cells, in accordance with transmission timing information received from the control unit 115. After the adjustment of transmission timings, the signals are up-converted to a radio frequency by the radio unit 101 and are transmitted from a transmission antenna. Note that a random access preamble is transmitted without the transmission timing thereof being adjusted, even if a transmission timing is set.

The radio unit 101 down-converts radio signals received from the antenna and supplies the radio signals to the reception processing units 105. The reception processing units 105-1 to 105-5 perform FFT (Fast Fourier Transform) processing, decoding, demodulation processing, and so forth on the signals received from the radio unit 101, and supply demodulated data to the control data extracting unit 109. Also, the reception processing units 105-1 to 105-5 measure radio channel characteristics of the downlink component carriers of the individual cells, and supply measurement results to the scheduling unit 117.

The control data extracting unit 109 refers to C-RNTI (mobile station apparatus identification information) which is arranged in the physical downlink control channels PDCCH of the individual cells and downlink scheduling information in the input data, and determines whether or not the input data is addressed to the own mobile station apparatus. If the input data is addressed to the own mobile station apparatus, the control data extracting unit 109 divides the data in the physical downlink shared channels PDSCH modulated by the reception processing units 105-1 to 105-5 into control data and user data. Then, the control data extracting unit 109 supplies the control data to the scheduling unit 117, and supplies the user data to an upper layer. Also, the control data extracting unit 109 supplies uplink scheduling information included in the physical downlink control channels PDCCH to the scheduling unit 117. Also, in a case where the control data extracting unit 109 detects RA-RNTI (Random Access-Radio Network Temporary Identity) after transmitting a random access preamble, the control data extracting unit 109 supplies a random access response message to the scheduling unit 117. Also, the control data extracting unit 109 instructs the scheduling unit 117 to respond to the received data. The control unit 115 controls the radio unit 101, the transmission processing units 103-1 to 103-5, the reception processing units 105-1 to 105-5, the transmission data control unit 107, and the control data extracting unit 109, in response to instructions from the scheduling unit 113.

The scheduling unit 117 includes the control data analyzing unit 119, the UL scheduling unit 121, the control data creating unit 123, and the cell management unit 125. The control data creating unit 123 creates control data, and creates a response to downlink data received by the control data extracting unit 109. The control data analyzing unit 119 analyzes the control data received from the control data extracting unit 109. The control data analyzing unit 119 supplies system information about the cells, allocation information about the cells, a random access response message, and random access instruction information which are received from the base station apparatus 3 to the cell management unit 125, and supplies random access information included in the system information to the random access preamble generating unit 111.

The UL scheduling unit 121 controls the transmission data control unit 107 on the basis of scheduling information about uplink data. Also, the UL scheduling unit 121 instructs the cell management unit 125 to execute random access on the basis of control information received from an upper layer.

The cell management unit 125 manages the cells which are set by the base station apparatus 3, and manages system information notified from the base station apparatus 3, such as the configuration of physical channels of the individual cells, transmission power information, and random access information. In a case where random access to the base station apparatus 3 is executed, the cell management unit 125 determines a cell with which a random access preamble is to be transmitted, randomly selects a sequence to be used on the basis of the downlink radio channel characteristic information received from the reception processing units 105-1 to 105-5 and the transmission data size of the message 3 by using random access information about the cell to be used for random access, and notifies the random access preamble generating unit 111 of information about the selected cell and a sequence number (preamble number). The details of random access will be described below.

Also, the cell management unit 125 determines the content of the random access response received from the control data analyzing unit 119. When the cell management unit 125 detects the preamble number of the transmitted random access preamble, the cell management unit 125 supplies transmission timing information to any of the transmission timing adjusting units 113-1 to 113-5 related to the cell used for random access, and supplies allocated radio resource information to the UL scheduling unit 121. After determining a contention resolution message, the cell management unit 125 ends the random access procedure. Also, the cell management unit 125 extracts a sequence number (preamble number) and a random access channel number from the random access instruction information received from the control data analyzing unit 119, and supplies the cell information, the sequence number (preamble number), and the random access channel number to the random access preamble generating unit 111.

The sequence selected by the mobile station apparatus 1 is referred to as a random sequence (random preamble), and the sequence specified by the base station apparatus 3 is referred to as a dedicated sequence (dedicated preamble). In a case where a cell to be used is not specified by the base station apparatus 3, the mobile station apparatus 1 executes random access by using the uplink component carrier of the cell with which the random access instruction information has been received. Also, in a case where a sequence to be used is not specified, the mobile station apparatus 1 selects a sequence from among random sequences.

In a case where the random access preamble generating unit 111 is notified of cell information and a sequence number from the scheduling unit 117, the random access preamble generating unit 111 creates a preamble portion and a CP portion on the basis of the random access information about the specified cell and the sequence number, and thereby generates a random access preamble. Also, the random access preamble generating unit 111 selects a random access channel position to be used on the basis of the random access information about the specified cell, and allocates the generated random access preamble to the selected random access channel position. In a case where the random access preamble generating unit 111 is notified of a cell number, a sequence number, and a random access channel number from the scheduling unit 117, the random access preamble generating unit 111 creates a preamble portion and a CP portion on the basis of the random access information about the specified component carrier and the sequence number, and thereby generates a random access preamble. Also, the random access preamble generating unit 111 selects a random access channel position to be used on the basis of the random access information about the specified cell and a random access number. Then, the random access preamble generating unit 111 allocates the generated random access preamble to the selected random access channel position in the specified component carrier.

Figure 2:
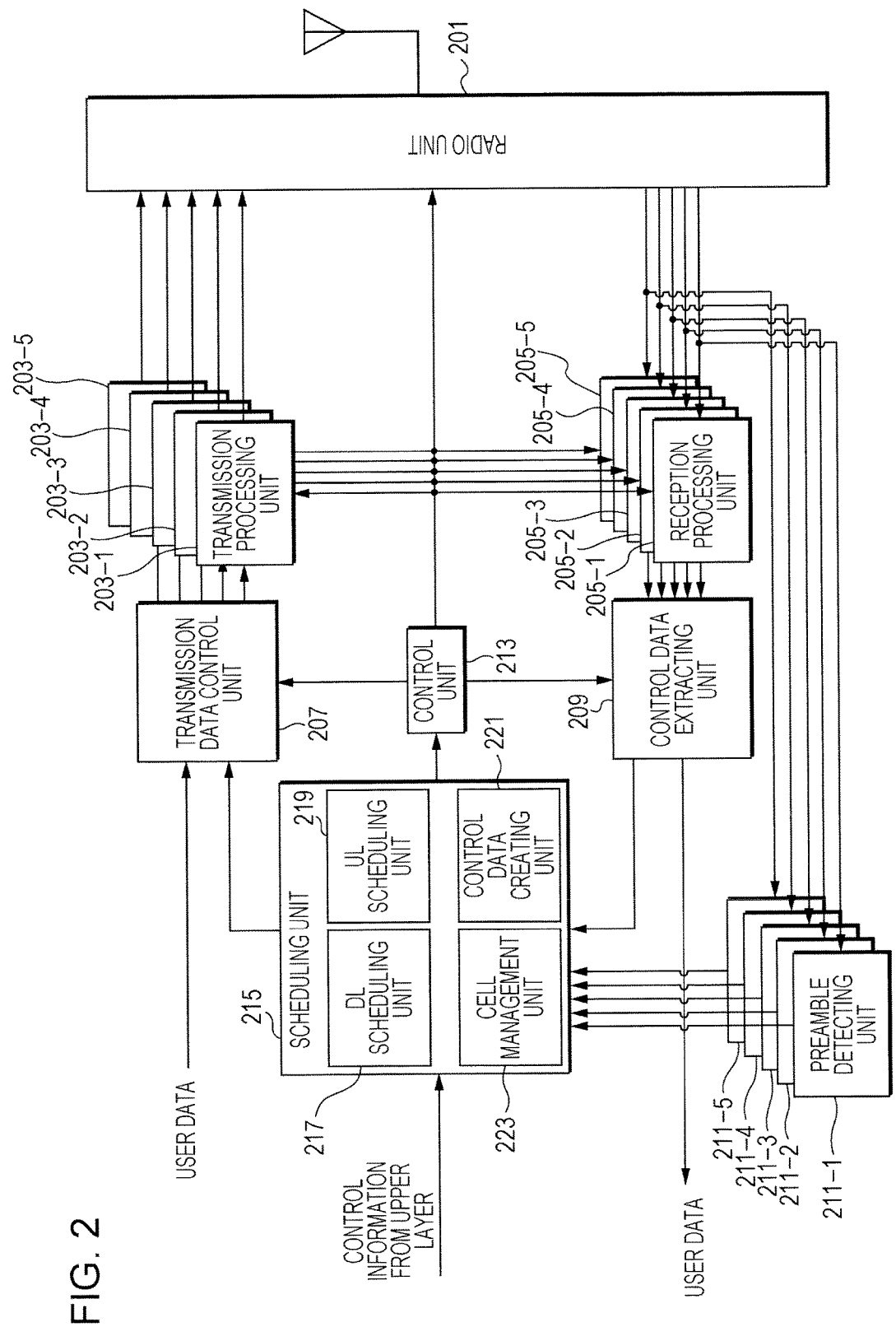
FIG. 2 is a block diagram illustrating the configuration of a base station apparatus according to the first embodiment of the present invention.

FIG. 2 illustrates a configuration diagram of the base station apparatus 3 according to an embodiment of the present invention. The base station apparatus 3 includes a radio unit 201, transmission processing units 203-1 to 203-5 (hereinafter, the transmission processing units 203-1 to 203-5 are collectively referred to as transmission processing units 203), reception processing units 205-1 to 205-5 (hereinafter, the reception processing units 205-1 to 205-5 are collectively referred to as reception processing units 205), a transmission data control unit 207, a control data extracting unit 209, preamble detecting units 211-1 to 211-5 (hereinafter, the preamble detecting units 211-1 to 211-5 are collectively referred to as preamble detecting units 211), a control unit 213, and a scheduling unit 215 (base-station-side scheduling unit). The scheduling unit 215 includes a DL scheduling unit 217, a UL scheduling unit 219, a control data creating unit 221, and a cell management unit 223. In this embodiment, an example of a case where the base station apparatus 3 has five cells is described, and thus five transmission processing units 203, five reception processing units 205, and five preamble detecting units 211 are provided.

In accordance with an instruction from the control unit 213, the transmission data control unit 207 maps user data and control data, that is, maps control data to the physical downlink control channels PDCCH, the downlink synchronization channels DSCH, the downlink pilot channels DPiCH, the physical broadcast channels PBCH, and the physical downlink shared channels PDSCH of the downlink component carriers of the individual cells, and maps the data to be transmitted to the individual mobile station apparatuses 1 to the physical downlink shared channels PDSCH.

The transmission processing units 203-1 to 203-5 modulate and encode the data to be transmitted, perform series/parallel conversion on input signals, and perform OFDM signal processing such as IFFT transform, insertion of CP, and filtering, thereby generating OFDM signals. The radio unit 201 up-converts the OFDM-modulated data to a radio frequency, and transmits the data to the mobile station apparatuses 1. Also, the radio unit 201 receives uplink data from the mobile station apparatuses 1, down-converts the data to baseband signals, and supplies the received signals to the reception processing units 205-1 to 205-5 or the preamble detecting units 211-1 to 211-5. The reception processing units 205-1 to 205-5 perform demodulation processing by using the uplink scheduling information received from the control unit 213 in view of the transmission processing executed by the mobile station apparatuses 1, so as to demodulate data. Also, the reception processing units 205-1 to 205-5 measure radio channel characteristics by using the uplink pilot channels UPiCH, and supply the results to the scheduling unit 215. It is assumed that a single carrier scheme, such as DFT-spread OFDM, is used as an uplink communication scheme. However, a multi-carrier scheme such as an OFDM scheme may be used.

The control data extracting unit 209 determines whether or not received data is correct or incorrect, and notifies the scheduling unit 215 of a determination result. If the received data is correct, the control data extracting unit 209 divides the received data into user data and control data. The control unit 213 controls the radio unit 201, the transmission processing units 203-1 to 203-5, the reception processing units 205-1 to 205-5, the transmission data control unit 207, and the control data extracting unit 209, on the basis of instructions from the scheduling unit 215.

The scheduling unit 215 includes the DL scheduling unit 217 which performs downlink scheduling, the UL scheduling unit 219 which performs uplink scheduling, the control data creating unit 221, and the cell management unit 223. The DL scheduling unit 217 performs scheduling for mapping user data and control data to individual downlink channels, on the basis of the downlink radio channel information notified from the mobile station apparatuses 1, data information about individual users notified from an upper layer, and the control data created by the control data creating unit 221. The UL scheduling unit 219 performs scheduling for mapping user data to individual uplink channels, on the basis of the uplink radio channel estimation result received from the reception processing units 205-1 to 205-5 and radio resource allocation requests from the mobile station apparatuses 1, and supplies a scheduling result to the control unit 213. In a case where the UL scheduling unit 219 is notified from the preamble detecting units 211 that a random access preamble has been detected, the UL scheduling unit 219 allocates the physical uplink shared channel PUSCH, and notifies the control data creating unit 221 of the allocated physical uplink shared channel PUSCH and a preamble number (sequence number).

The cell management unit 223 manages individual cells and system information about the cells (for example, configuration information about physical channels, transmission power information about individual channels, and random access information). Also, the cell management unit 223 allocates cells to the mobile station apparatus 1, and determines a cell for which random access is permitted among the allocated cells. Then, the cell management unit 223 supplies system information to the control data creating unit 221 to notify the control data creating unit 221 of the system information about the allocated cells. The system information about the cell for which random access is permitted includes random access information (arrangement information about random access channels RACH, random access preamble generation information, and transmission information about a random access preamble, such as the maximum number of transmissions of a random access preamble and transmission power for the random access preamble). The system information about the cell for which random access is not permitted does not include random access information. Also, in the case of allowing the mobile station apparatus 1 to execute random access, the cell management unit 223 selects a dedicated sequence (dedicated preamble) and the position of a random access channel RACH, and supplies the selected dedicated sequence number and random access channel number to the control data creating unit 221.

The control data creating unit 221 creates control data to be set to the physical downlink control channel PDCCH and control data to be set to the physical downlink shared channel PDSCH. The control data creating unit 221 creates control data, such as a control message including scheduling information; ACK/NACK of uplink data; a system information message including configuration information about physical channels, transmission power information about individual channels, and random access information; an initial setting message including setting information about a cell to be used (including random access information); a random access response message including a preamble number, transmission timing information, and scheduling information; a contention resolution message; and a message including a dedicated sequence number, a random access channel number, and a random access instruction.

In a case where the preamble detecting units 211-1 to 211-5 detect a random access preamble in a random access channel RACH, the preamble detecting units 211-1 to 211-5 calculate an amount of difference in transmission timing on the basis of the detected random access preamble, and notify the scheduling unit 215 of the cell in which the random access preamble has been detected, a detected preamble number (sequence number), and the amount of difference in transmission timing.

[Description of Operation]

A radio communication system which uses the random access procedures illustrated in FIGS. 7 and 8 is assumed. Also, a radio communication system in which the base station apparatus 3 and the mobile station apparatus 1 communicate with each other by using a plurality of cells among which the transmission timing in the mobile station apparatus 1 varies, as illustrated in FIGS. 10, 11, and 12, is assumed.

In Advanced-EUTRA, the base station apparatus 3 allocates one or more cells of different frequencies suitable for the communication capacity and communication condition of the mobile station apparatus 1 among a plurality of cells for each frequency, and the mobile station apparatus 1 transmits and receives data by using the allocated cell or cells. In a case where the mobile station apparatus 1 communicates with the base station apparatus 3 by using a plurality of cells, the mobile station apparatus 1 may connect to the base station apparatus 3 via a repeater or the like, as illustrated in FIG. 12. In such a case, the reception timing of a downlink component carrier in the mobile station apparatus 1 may vary among individual cells. Furthermore, the transmission timing for the base station apparatus 3 may vary among individual uplink component carriers of individual cells. If the transmission timing of each uplink component carrier for the base station apparatus 3 varies, it is necessary for the mobile station apparatus 1 to adjust transmission timings in individual uplink component carriers of individual cells.

However, in a case where it is necessary to adjust the transmission timing in the mobile station apparatus 1 in individual cells, if uplink synchronization is lost, for example, at the time of initial access or handover, random access processing is required for each cell. In a case where each mobile station apparatus 1 is allocated with a plurality of cells and where random access processing operations are simultaneously executed in the individual cells, the processing executed in the mobile station apparatus 1 becomes complicated. In addition, since each mobile station apparatus 1 executes a plurality of random access processing operations, the probability of the occurrence of collision of random access preambles among the mobile station apparatuses 1 increases, and the occurrence of collision of random access preambles in the entire cells increases. Thus, the opportunities of transmitting an unnecessary random access preamble are decreased by restricting execution of random access by the mobile station apparatuses 1.

The base station apparatus 3 groups cells into groups in each of which cells have an identical transmission timing in the mobile station apparatus 1 (hereinafter referred to as transmission timing cell groups). The base station apparatus 3 permits random access for one cell in each transmission timing cell group. The base station apparatus 3 notifies the mobile station apparatus 1 of system information about only the cell for which random access is permitted, the system information including random access information (arrangement information about random access channels RACH, random access preamble generation information, the maximum number of transmissions of a random access preamble, transmission power information about a random access preamble, and so forth). Accordingly, the mobile station apparatus 1 is incapable of executing random access using a cell whose random access information is not available, and thus execution of random access can be restricted, and unnecessary random access can be prevented. Note that the system information is information constituting a cell, such as configuration information about uplink/downlink physical channels and transmission information about uplink/downlink physical channels. The random access information is information that is necessary for executing a random access procedure related to transmission of a random access preamble, such as arrangement information about random access channels RACH, information for generating a random access preamble, and information about the maximum number of transmissions of a random access preamble and transmission power.

Furthermore, the base station apparatus 3 permits both of contention based random access and non-contention based random access for one of the cells for which random access by the mobile station apparatus 1 is permitted, and permits non-contention based random access for the other cells for which random access is permitted. Accordingly, the mobile station apparatus 1 is incapable of executing random access using a cell for which only non-contention based random access is permitted, as long as an instruction is not provided from the base station apparatus 3, and thus execution of random access can be restricted.

Alternatively, the random access to be permitted may be specified for each transmission timing cell group. That is, the base station apparatus 3 is capable of restricting execution of random access from the mobile station apparatus 1 by permitting both of contention based random access and non-contention based random access, or non-contention based random access for each of the cells for which random access is permitted. Alternatively, the base station apparatus 3 may enable selection of only contention based random access.

The operations of the mobile station apparatus 1-1 and the base station apparatus 3 will be described. The base station apparatus 3 is constituted by, for example, cells #1 to #5, as illustrated in FIG. 3A. Cells #1 to #3 form a cell group of an identical transmission timing, and cells #4 and #5 form another cell group of an identical transmission timing.

The mobile station apparatus 1-1 executes cell search, and finds one of the cells of the base station apparatus 3. Here, it is assumed that the mobile station apparatus 1-1 finds cell #1. The mobile station apparatus 1-1 obtains system information about cell #1 (physical channel configuration of the cell, transmission power information, random access information, etc.) from the physical broadcast channel PBCH of cell #1. Then, by using the random access information included in the system information, the mobile station apparatus 1-1 transmits a random access preamble to the random access channel RACH of cell #1 for initial access. Then, the mobile station apparatus 1-1 obtains random access response information including transmission timing information about cell #1 from the base station apparatus 3, sets a transmission timing of an uplink component carrier for cell #1, and starts a transmission timing timer. The mobile station apparatus 1-1 transmits a message 3 to the base station apparatus 3 via cell #1. The message 3 includes the content representing initial access. Upon receiving a contention resolution from the base station apparatus 3, the mobile station apparatus 1-1 ends the contention based random access procedure.

After the random access procedure has been completed, the base station apparatus 3 allocates the cells to be used by the mobile station apparatus 1-1, and notifies the mobile station apparatus 1-1 of the system information about the cells to be used by the mobile station apparatus 1-1. Here, the base station apparatus 3 notifies the mobile station apparatus 1-1 by including, in the system information, random access information about only the cells for which random access is permitted in individual transmission timing cell groups. The mobile station apparatus 1-1 recognizes that random access is permitted for the cells whose random access information is included in the system information among the allocated cells. Also, the base station apparatus 3 notifies the mobile station apparatus 1-1 of information indicating that both of contention based random access and non-contention based random access are permitted for the cells for which random access is permitted, or information indicating that non-contention based random access is permitted. Alternatively, the base station apparatus 3 may notify the mobile station apparatus 1-1 of only information indicating that both of contention based random access and non-contention based random access are permitted for one of the cells for which random access is permitted, so that the mobile station apparatus 1-1 recognizes that only non-contention based random access is permitted for the other cells for which random access is permitted.

Here, as illustrated in FIG. 3B, the base station apparatus 3 allocates cells #1 to #5 to the mobile station apparatus 1-1, and permits contention based random access and non-contention based random access for cell #1, and permits non-contention based random access for cell #5. The base station apparatus 3 notifies the mobile station apparatus 1-1 of setting information, such as the system information about the allocated cells and group information about the transmission timing cell groups. Here, the base station apparatus 3 notifies the mobile station apparatus 1-1 without including random access information in the system information about cells for which random access is not permitted. Here, the base station apparatus 3 does not notify the mobile station apparatus 1-1 of random access information about cells #2, #3, and #4. The mobile station apparatus 1-1 recognizes that random access is not permitted for the cells whose random access information is not included in the system information among the allocated cells.

After obtaining the allocated system information and the group information about the transmission timing cell groups, the mobile station apparatus 1-1 sets the transmission timing of cell #1 as the uplink transmission timings of cells #2 and #3, which are in the same transmission timing cell group as cell #1. After that, data is transmitted and received between the mobile station apparatus 1-1 and the base station apparatus 3 via the downlink component carriers of cells #1 to #5 and the uplink component carriers of cells #1 to #3.

In a case where the amount of data transmitted from the mobile station apparatus 1-1 increases and where there is a cell which is not used by the mobile station apparatus 1-1, the base station apparatus 3 notifies, by using the physical downlink control channel PDCCH, the mobile station apparatus 1-1 of random access instruction information for providing an instruction to execute non-contention based random access using the cell for which random access is permitted. Here, the base station apparatus 3 notifies the mobile station apparatus 1-1 of the random access instruction information about cell #5. The random access instruction information includes a preamble number and a random access channel number. The mobile station apparatus 1-1 determines the preamble number, and, if the preamble number indicates non-contention based random access, the mobile station apparatus 1-1 transmits a random access preamble to the random access channel RACH of cell #5 by using the preamble and random access channel specified by the base station apparatus 3. The base station apparatus 3 notifies the mobile station apparatus 1-1 of the random access instruction information by using the downlink component carrier of the cell which is a target of random access.

Upon detecting the random access preamble, the base station apparatus 3 calculates a transmission timing on the basis of the random access preamble, and transmits a random access response including transmission timing information to the mobile station apparatus 1-1 via the downlink component carrier of cell #5. Upon receiving the random access response, the mobile station apparatus 1-1 sets the transmission timing included in the random access response as the transmission timing of the uplink of cell #5 and as the transmission timing of the uplink of cell #4 in the same transmission timing cell group, and starts a transmission timing timer. Then, the mobile station apparatus 1-1 completes the non-contention based random access procedure. After that, data is transmitted and received between the mobile station apparatus 1-1 and the base station apparatus 3 also by using the uplink component carriers of cells #4 and #5.

The mobile station apparatus 1-1 has one transmission timing timer for each transmission timing cell group, and starts or restarts the transmission timing timer upon receiving transmission timing information. While the transmission timing timer is running, uplink synchronization is achieved (transmission timing is valid), and uplink transmission on the uplink component carriers of a target transmission timing cell group is possible. While the timer is stopped, uplink synchronization is lost (transmission timing is invalid), and uplink data transmission on the uplink component carriers of a target transmission timing cell group is impossible, except for transmission of a random access preamble.

The mobile station apparatus 1-1 does not execute a random access procedure when receiving random access instruction information regarding a cell other than a cell for which random access is permitted. Also, the mobile station apparatus 1-1 does not execute a random access procedure when receiving random access instruction information for providing an instruction to execute contention based random access regarding a cell for which only non-contention based random access is permitted.

In a case where uplink transmission data is newly generated in a state where there is no allocation of a physical uplink shared channel PUSCH from the base station apparatus 3 and where uplink synchronization is achieved (transmission timing is valid) or is not achieved (transmission timing is invalid), the mobile station apparatus 1-1 executes contention based random access as a scheduling request. At this time, the mobile station apparatus 1-1 selects a cell for which contention based random access is permitted for the uplink component carrier of the cell used in random access. Here, the mobile station apparatus 1-1 selects cell #1. Then, the mobile station apparatus 1-1 selects one random sequence by using random access information about the cell for which contention based random access is permitted, generates a random access preamble, and transmits the random access preamble to the random access channel RACH of cell #1.

Upon receiving a random access response from the base station apparatus 3 via the downlink component carrier of cell #1, the mobile station apparatus 1-1 sets obtained transmission timing information as an uplink transmission timing of cell #1 and as uplink transmission timings of cells #2 and #3 in the same transmission timing group, and starts a transmission timing timer. Then, the mobile station apparatus 1-1 includes transmission buffer status information about the mobile station apparatus 1-1 in a message 3, and notifies the base station apparatus 3 of the message 3. The mobile station apparatus 1-1 ends contention based random access upon receiving a contention resolution from the base station apparatus 3.

The base station apparatus 3 may change the cell for which random access is permitted, in accordance with an access status of the random access channel RACH. In the case of changing the cell for which random access is permitted, the base station apparatus 3 notifies the mobile station apparatus 1-1 of random access information about the cell for which random access is newly permitted. The mobile station apparatus 1-1 sets the obtained random access information, and deletes old random access information.

For example, in the case of changing cell #5 for which non-contention based random access is permitted to cell #4, the base station apparatus 3 notifies the mobile station apparatus 1-1 of random access information about cell #4. Upon receiving the random access information about cell #4, the mobile station apparatus 1-1 sets the random access information about cell #4, and deletes the random access information about cell #5. At this time, the mobile station apparatus 1-1 recognizes that the cell for which random access is permitted has changed within the same transmission timing cell group, and performs setting under the assumption that the random access which is permitted for cell #4 is non-contention based random access. The mobile station apparatus 1-1 does not change the setting of a cell for which random access is permitted in different transmission timing cell groups. Additionally, in the case of changing a permitted random access procedure, information indicating the permitted random access procedure is also notified.

In a case where the mobile station apparatus 1-1 receives, from the base station apparatus 3, random access instruction information about a cell for which non-contention based random access is permitted during processing of a contention based random access procedure, the mobile station apparatus 1-1 continues the contention based random access processing which is being executed and ignores the ransom access instruction information from the base station apparatus 3, or stops the contention based random access processing which is being executed and performs random access using the cell specified in accordance with the random access instruction information received from the base station apparatus 3. In a case where the mobile station apparatus 1-1 receives random access instruction information about a cell during random access processing which is based on random access instruction information from the base station apparatus 3, the mobile station apparatus 1-1 places priority on the first random access instruction and ignores the subsequent random access instruction information. In this way, the mobile station apparatus 1-1 does not simultaneously execute a plurality of random access processing operations.

Also, regarding random access using a cell for which both of contention based random access and non-contention based random access are permitted, if the number of transmissions of a random access preamble exceeds the maximum number of transmissions, the base station apparatus 1-1 determines that random access has failed. However, regarding random access using a cell for which non-contention based random access is permitted, the mobile station apparatus 1-1 does not determine that random access has failed even if the number of transmissions of a random access preamble exceeds the maximum number of transmissions. With this configuration, the occurrence of random access failure can be suppressed.

In the above-described embodiment, description has been given of a method for restricting random accesses by permitting contention based random access and non-contention based random access for one cell in one transmission timing cell group and by permitting non-contention based random access for one cell in each of the other transmission timing cell groups. Alternatively, contention based random access may be random access which is based on a scheduling request, and non-contention based random access may be random access which is based on random access instruction information. That is, random accesses can be restricted by permitting random access which is based on a scheduling request and random access which is based on random access instruction information for one cell in one transmission timing cell group and by permitting random access which is based on random access instruction information for one cell in each of the other transmission timing cell groups.

Accordingly, unnecessary random access does not occur. Also, the mobile station apparatuses 1 do not need to simultaneously execute random access processing, and thus random access processing in the mobile station apparatuses 1 can be prevented from being complicated.

Second Embodiment

[Description of Configuration]

The configuration of the mobile station apparatus 1 according to a second embodiment of the present invention is the same as that in FIG. 1. The mobile station apparatus 1 includes the radio unit 101, the transmission processing units 103-1 to 103-5, the reception processing units 105-1 to 105-5, the transmission data control unit 107, the control data extracting unit 109, the random access preamble generating unit 111, the transmission timing adjusting units 113-1 to 113-5, the control unit 115, and the scheduling unit 117. The scheduling unit 117 includes the control data analyzing unit 119, the UL scheduling unit 121, the control data creating unit 123, and the cell management unit 125. In this embodiment, in order to describe an example in which the mobile station apparatus 1 is capable of receiving signals using five cells, five transmission processing units 103, five reception processing units 105, and five transmission timing adjusting units 113 are provided.

The operations of the radio unit 101, the transmission processing units 103-1 to 103-5, the reception processing units 105-1 to 105-5, the transmission data control unit 107, the control data extracting unit 109, the random access preamble generating unit 111, the transmission timing adjusting units 113-1 to 113-5, and the control unit 115 are the same as the operations described above with reference to FIG. 1, and thus the description thereof is omitted.

The scheduling unit 117 includes the control data analyzing unit 119, the UL scheduling unit 121, the control data creating unit 123, and the cell management unit 125. The control data creating unit 123 creates control data, and creates a response to downlink data received by the control data extracting unit 109. The control data analyzing unit 119 analyzes the control data received from the control data extracting unit 109. The control data analyzing unit 119 supplies system information about the cells, allocation information about the cells, a random access response message, and random access instruction information which are received from the base station apparatus 3 to the cell management unit 125, and supplies random access information included in the system information to the random access preamble generating unit 111.

The UL scheduling unit 121 controls the transmission data control unit 107 on the basis of scheduling information about uplink data. Also, the UL scheduling unit 121 instructs the cell management unit 125 to execute random access on the basis of control information received from an upper layer.

The cell management unit 125 manages the cells which are set by the base station apparatus 3, and manages system information notified from the base station apparatus 3, such as the configuration of physical channels of the individual cells, transmission power information, and random access information. Also, the cell management unit 125 manages the operations of the mobile station apparatus 1 for each of a first cell, second cell, and third cell. In a case where random access to the base station apparatus 3 is executed, the cell management unit 125 determines a cell with which a random access preamble is to be transmitted, randomly selects a sequence to be used on the basis of the downlink radio channel characteristic information received from the reception processing units 105-1 to 105-5 and the transmission data size of the message 3 by using random access information about the cell to be used for random access, and notifies the random access preamble generating unit 111 of information about the selected cell and a sequence number (preamble number). The details of random access will be described below.

Also, the cell management unit 125 determines the content of the random access response received from the control data analyzing unit 119. When the cell management unit 125 detects the preamble number of the transmitted random access preamble, the cell management unit 125 supplies transmission timing information to any of the transmission timing adjusting units 113-1 to 113-5 related to the cell used for random access, and supplies allocated radio resource information to the UL scheduling unit 121. After determining a contention resolution message, the cell management unit 125 ends the random access procedure. Also, the cell management unit 125 extracts a sequence number (preamble number) and a random access channel number from the random access instruction information received from the control data analyzing unit 119, and supplies the cell information, the sequence number (preamble number), and the random access channel number to the random access preamble generating unit 111.

The sequence selected by the mobile station apparatus 1 is referred to as a random sequence (random preamble), and the sequence specified by the base station apparatus 3 is referred to as a dedicated sequence (dedicated preamble). In a case where a cell to be used is not specified by the base station apparatus 3, the mobile station apparatus 1 executes random access by using the uplink component carrier of the cell with which the random access instruction information has been received. Also, in a case where a sequence to be used is not specified, the mobile station apparatus 1 selects a sequence from among random sequences.

The configuration of the base station apparatus 3 according to the second embodiment of the present invention is the same as that illustrated in FIG. 2. The base station apparatus 3 includes the radio unit 201, the transmission processing units 203-1 to 203-5, the reception processing units 205-1 to 205-5, the transmission data control unit 207, the control data extracting unit 209, the preamble detecting units 211-1 to 211-5, the control unit 213, and the scheduling unit 215 (base-station-side scheduling unit). The scheduling unit 215 includes the DL scheduling unit 217, the UL scheduling unit 219, the control data creating unit 221, and the cell management unit 223. In this embodiment, an example of a case where the base station apparatus 3 has five cells is described, and thus five transmission processing units 203, five reception processing units 205, and five preamble detecting units 211 are provided.

The operations of the radio unit 201, the transmission processing units 203-1 to 203-5, the reception processing units 205-1 to 205-5, the transmission data control unit 207, the control data extracting unit 209, the preamble detecting units 211-1 to 211-5, and the control unit 213 are the same as those described above with reference to FIG. 2, and thus the description of the operations is omitted.

The scheduling unit 215 includes the DL scheduling unit 217 which performs downlink scheduling, the UL scheduling unit 219 which performs uplink scheduling, the control data creating unit 221, and the cell management unit 223. The DL scheduling unit 217 performs scheduling for mapping user data and control data to individual downlink channels, on the basis of the downlink radio channel information notified from the mobile station apparatuses 1, data information about individual users notified from an upper layer, and the control data created by the control data creating unit 221. The UL scheduling unit 219 performs scheduling for mapping user data to individual uplink channels, on the basis of the uplink radio channel estimation result received from the reception processing units 205-1 to 205-5 and radio resource allocation requests from the mobile station apparatuses 1, and supplies a scheduling result to the control unit 213. In a case where the UL scheduling unit 219 is notified from the preamble detecting units 211 that a random access preamble has been detected, the UL scheduling unit 219 allocates the physical uplink shared channel PUSCH, and notifies the control data creating unit 221 of the allocated physical uplink shared channel PUSCH and a preamble number (sequence number).

The cell management unit 223 manages individual cells and system information about the cells (for example, configuration information about physical channels, transmission power information about individual channels, and random access information). Also, the cell management unit 223 allocates cells to the mobile station apparatus 1, and determines a first cell, second cell, and third cell among the allocated cells. Then, the cell management unit 223 supplies system information to the control data creating unit 221 to notify the control data creating unit 221 of the system information about the allocated cells. The system information about the first cell and the second cell includes random access information (arrangement information about random access channels RACH, random access preamble generation information, and random access preamble transmission information, such as the maximum number of transmissions of a random access preamble and transmission power for the random access preamble). The system information about the third cell does not include random access information. Also, in the case of allowing the mobile station apparatus 1 to execute random access, the cell management unit 223 selects a dedicated sequence (dedicated preamble) and the position of a random access channel RACH, and supplies the selected dedicated sequence number and random access channel number to the control data creating unit 221.

The control data creating unit 221 creates control data to be set to the physical downlink control channel PDCCH and control data to be set to the physical downlink shared channel PDSCH. The control data creating unit 221 creates control data, such as a control message including scheduling information; ACK/NACK of uplink data; a system information message including configuration information about physical channels, transmission power information about individual channels, and random access information; an initial setting message including setting information about a cell to be used (including random access information); a random access response message including a preamble number, transmission timing information, and scheduling information; a contention resolution message; and a message including a dedicated sequence number, a random access channel number, and a random access instruction.

[Description of Operation]

In this embodiment, description will be given of a cell management method including a random access restriction method. The base station apparatus 3 groups a plurality of cells into a plurality of transmission timing cell groups in each of which cells have an identical transmission timing. In the case of allocating a plurality of cells to the mobile station apparatus 1, the base station apparatus 3 sets one of the cells in one of the plurality of transmission timing cell groups as a first cell. Also, the base station apparatus 3 sets one of the cells in each of the other transmission timing cell groups as second cells, and sets the cells other than the first and second cells as third cells.

The base station apparatus 3 is configured to permit contention based random access and non-contention based random access for the first cell. Also, the base station apparatus 3 notifies the base station apparatus 1 of update information of system information about the individual cells via the first cell, and arranges the physical uplink control channel PUCCH to be used by the mobile station apparatus 1 on the physical uplink control channel PUCCH of the first cell. The base station apparatus 3 is configured to permit non-contention based random access for the second cells. Also, the base station apparatus 3 notifies the mobile station apparatus 1 of transmission timing information via the first and second cells. The base station apparatus 3 is configured not to permit random access for the third cells. The mobile station apparatus 1 determines whether or not random access has failed in the first cell, and does not determine whether or not random access has failed in the second cells. Also, the mobile station apparatus 1 determines a radio quality error of downlink in the first cell, and does not determine a radio quality error of downlink in the second and third cells.

In this way, necessary functions are set in the order of the first cell, second cells, and third cells, and an important function is set to the first cell, so that the cells can be easily managed. Also, with this method, the restriction of random access and the management of random access failure described in the first embodiment can be performed.

The operations of the mobile station apparatus 1-1 and the base station apparatus 3 will be described. For example, it is assumed that the base station apparatus 3 is constituted by cells #1 to #5, as illustrated in FIG. 4A, and that cells #1 and #2 are in the cell group of an identical transmission timing (first transmission timing cell group), cells #3 and #4 are in the cell group of an identical transmission timing (second transmission timing cell group), and cell #5 is in the cell group of an identical transmission timing (third transmission timing cell group).

The mobile station apparatus 1-1 executes cell search, and finds one of the cells of the base station apparatus 3. Here, it is assumed that the mobile station apparatus 1-1 finds cell #2. The mobile station apparatus 1-1 obtains system information about cell #2 (physical channel configuration of the cell, transmission power information, random access information, etc.) from the physical broadcast channel PBCH of cell #2. Then, by using the random access information included in the system information, the mobile station apparatus 1-1 transmits a random access preamble to the random access channel RACH of cell #2 for initial access. Then, the mobile station apparatus 1-1 obtains random access response information including transmission timing information about cell #2 from the base station apparatus 3, sets a transmission timing of an uplink component carrier for cell #2, and starts a transmission timing timer. The mobile station apparatus 1-1 transmits a message 3 to the base station apparatus 3 via cell #2. The message 3 includes the content representing initial access. Upon receiving a contention resolution from the base station apparatus 3, the mobile station apparatus 1-1 ends the contention based random access procedure.

After the random access procedure has been completed, the base station apparatus 3 allocates the cells to be used by the mobile station apparatus 1-1, and also sets first, second, and third cells. Here, as illustrated in FIG. 4B, the base station apparatus 3 allocates cells #1 to #5 to the mobile station apparatus 1-1, and sets cell #2 as a first cell, cells #4 and #5 as second cells, and cells #1 and #3 as third cells. Then, the base station apparatus 3 notifies the mobile station apparatus 1-1 of setting information, such as system information about the allocated cells and group information about the transmission timing cell groups. The base station apparatus 3 notifies the mobile station apparatus 1-1 by including random access information in the system information about the first and second cells, and by not including random access information in the system information about the third cell. That is, the base station apparatus 3 does not notify the mobile station apparatus 1-1 of random access information about cells #1 and #3. The setting information about the first cell includes allocation information about the physical uplink control channel PUCCH.

After obtaining the system information about the individual cells and the group information about the transmission timing cell groups, the mobile station apparatus 1-1 sets the transmission timing of the cells in the same transmission timing cell group. Here, the mobile station apparatus 1-1 sets the transmission timing of cell #2 as the uplink transmission timing of cell #1. After that, user data is transmitted and received between the mobile station apparatus 1-1 and the base station apparatus 3 via the downlink component carriers of cells #1 to #5 and the uplink component carriers of cells #1 and #2.

In a case where the amount data transmitted from the mobile station apparatus 1-1 increases, the base station apparatus 3 notifies the mobile station apparatus 1-1 of random access instruction information for providing an instruction to execute non-contention based random access using the second cell, via the physical downlink control channel PDCCH. Here, the base station apparatus 3 notifies the mobile station apparatus 1-1 of the random access instruction information about cell #4. The random access instruction information includes a preamble number and a random access channel number. The mobile station apparatus 1-1 determines the preamble number. If the preamble number indicates non-contention based random access, the mobile station apparatus 1-1 transmits a random access preamble to the random access channel RACH of cell #4 by using the preamble and random access channel specified by the base station apparatus 3.

Upon detecting the random access preamble, the base station apparatus 3 calculates a transmission timing on the basis of the random access preamble, and transmits a random access response including transmission timing information to the mobile station apparatus 1-1 via the downlink component carrier of cell #4. Upon receiving the random access response, the mobile station apparatus 1-1 sets the transmission timing included in the random access response as the transmission timing of the uplink of cell #4 and as the transmission timing of the uplink of cell #3 in the same transmission timing cell group, and starts a transmission timing timer. Then, the mobile station apparatus 1-1 ends the non-contention based random access procedure. After that, data is transmitted and received between the mobile station apparatus 1-1 and the base station apparatus 3 also by using the uplink component carriers of cells #3 and #4. In a case where a cell to be used for uplink transmission is further required, the base station apparatus 3 notifies the mobile station apparatus 1-1 of random access instruction information for providing an instruction to execute non-contention based random access using cell #5 as the second cell, by using the physical downlink control channel PDCCH of cell #5.

The mobile station apparatus 1-1 has one transmission timing timer for each transmission timing cell group, and starts or restarts the transmission timing timer upon receiving transmission timing information. While the transmission timing timer is running, uplink synchronization is achieved (transmission timing is valid), and uplink transmission on the uplink component carriers of a target transmission timing cell group is possible. While the timer is stopped, uplink synchronization is lost (transmission timing is invalid), and uplink data transmission on the uplink component carriers of a target transmission timing cell group is impossible.

The mobile station apparatus 1-1 does not execute a random access procedure when receiving random access instruction information regarding a third cell. Also, the mobile station apparatus 1-1 does not execute a random access procedure when receiving random access instruction information for providing an instruction to execute contention based random access regarding a second cell.

In a case where uplink transmission data is newly generated in a state where there is no allocation of a physical uplink shared channel PUSCH from the base station apparatus 3 and where uplink synchronization is achieved (transmission timing is valid) or is not achieved (transmission timing is invalid), the mobile station apparatus 1-1 executes contention based random access as a scheduling request. At this time, the mobile station apparatus 1-1 selects the first cell. Here, the mobile station apparatus 1-1 selects cell #2. Then, the mobile station apparatus 1-1 selects one random sequence by using random access information about the first cell, generates a random access preamble, and transmits the random access preamble to the random access channel RACH of the first cell. Then, upon receiving a random access response from the base station apparatus 3 via the downlink component carrier of the first cell, the mobile station apparatus 1-1 sets transmission timing information included in the random access response as an uplink transmission timing of the first cell and as an uplink transmission timing of the cell in the same transmission timing group, and starts a transmission timing timer. Then, the mobile station apparatus 1-1 includes transmission buffer status information about the mobile station apparatus 1-1 in a message 3, and notifies the base station apparatus 3 of the message 3. The mobile station apparatus 1-1 ends contention based random access upon receiving a contention resolution from the base station apparatus 3.

The base station apparatus 3 may change the first cell or second cell, in accordance with a radio channel condition or a communication status. In the case of changing the first cell, the base station apparatus 3 notifies the mobile station apparatus 1-1 of allocation information about the physical uplink control channel PUCCH for a new first cell and random access information about the new first cell. The mobile station apparatus 1-1 sets the obtained allocation information about the physical uplink control channel PUCCH and random access information, releases the radio resource of the uplink PUCCH allocated to the old first cell, and deletes random access information about the old first cell. Also, the mobile station apparatus 1-1 recognizes the change of the first cell by being allocated with the physical uplink control channel PUCCH.

In the case of changing the second cell, the base station apparatus 3 notifies the mobile station apparatus 1-1 of random access information about a new second cell. The mobile station apparatus 1-1 sets the obtained random access information, and deletes random access information about the old second cell. Also, the mobile station apparatus 1-1 recognizes the change of the second cell by not being allocated with the physical uplink control channel PUCCH.

For example, in the case of changing cell #2 as the first cell to cell #1, the base station apparatus 3 notifies the mobile station apparatus 1-1 of the allocation information about the physical uplink control channel PUCCH of cell #1 and the random access information about cell #1. Upon receiving the allocation information about the physical uplink control channel and the random access information about cell #1, the mobile station apparatus 1-1 sets the random access information about cell #1, releases the radio resource of the physical uplink control channel PUCCH which has been allocated to cell #2, and deletes the random access information about cell #2.

In a case where the mobile station apparatus 1-1 receives random access instruction information about the first cell or second cell from the base station apparatus 3 during processing of a random access procedure, the mobile station apparatus 1-1 continues the random access processing which is being executed and ignores the random access instruction information received from the base station apparatus 3, or stops the random access processing which is being executed and executes random access by using the cell specified in accordance with the random access instruction information received from the base station apparatus 3. In this way, the mobile station apparatus 1-1 does not simultaneously execute a plurality of random access processing operations.

Also, regarding random access using the first cell, if the number of transmissions of a random access preamble exceeds the maximum number of transmissions, the base station apparatus 1-1 determines that random access has failed. However, regarding random access using the second cell, the mobile station apparatus 1-1 does not determine that random access has failed even if the number of transmissions of a random access preamble exceeds the maximum number of transmissions. With this configuration, the occurrence of random access failure can be suppressed.

In the above-described embodiment, description has been given of a method for restricting random accesses by permitting contention based random access and non-contention based random access for the first cell and by permitting non-contention based random access for the second cell. Alternatively, contention based random access may be random access which is based on a scheduling request, and non-contention based random access may be random access which is based on random access instruction information. That is, random accesses can be restricted by permitting random access which is based on a scheduling request and random access which is based on random access instruction information for the first cell and by permitting random access which is based on random access instruction information for the second cell.

In this way, necessary functions are set in the order of the first cell, second cells, and third cells, and an important function is set to the first cell, so that the cells can be easily managed. Also, with this method, the restriction of random access and the management of random access failure can be performed.

An embodiment of the present invention has been described in detail with reference to the drawings. The specific configuration is not limited to that described above, and various changes in design can be made without deviating from the gist of the present invention.

For the convenience of description, the mobile station apparatus 1-1 and the base station apparatus 3 according to the embodiment have been described by using functional block diagrams. A program for realizing the functions of the individual units of the mobile station apparatus 1-1 and the base station apparatus 3 or part of these functions may be recorded on a computer-readable recording medium, the program recorded on the recording medium may be caused to be read into a computer system so as to be executed, and thereby the mobile station apparatus 1 and the base station apparatus 3 may be controlled. Here, the "computer system" includes hardware, such as an OS and peripheral devices.

The "computer-readable recording medium" is a portable medium, such as a flexible disk, a magneto-optical disk, a ROM, or a CD-ROM, or a storage device such as a hard disk built in the computer system. Furthermore, the "computer-readable recording medium" includes a medium which dynamically holds a program for a short time, such as a communication line used for transmitting a program via a network such as the Internet or a communication line such as a telephone line, and a medium which holds a program for a certain period, such as a volatile memory in the computer system serving as a server or a client in that case. The above-described program may be used for realizing part of the above-described function, and may be a program with which the above-described functions can be realized in combination with a program which has already been recorded in the computer system.

The individual functional blocks used in the above-described embodiments may be realized by an LSI, which is typically an integrated circuit. The individual functional blocks may be individually mounted on chips, or some or all of them may be integrated to be mounted on a chip. A method for integration may be realized by a dedicated circuit or a general-purpose processor, as well as an LSI. In a case where the progress of semiconductor technologies produces an integration technology which replaces an LSI, an integrated circuit according to the technology can be used.

The embodiments of the present invention have been described in detail with reference to the drawings. Specific configurations are not limited to these embodiments, and design within a scope of the gist of the present invention is included in the claims.

REFERENCE SIGNS LIST

1, 1-1 to 1-3 mobile station apparatus
3 base station apparatus
5-1, 5-2 repeater
101, 201 radio unit
103-1 to 103-5, 203-1 to 203-5 transmission processing unit
105-1 to 105-5, 205-1 to 205-5 reception processing unit
117, 215 scheduling unit

The invention claimed is:

1. A mobile station apparatus applied to a mobile communication system in which a plurality of cells are allocated to the mobile station apparatus, the plurality of cells grouped into a plurality of cell groups, the mobile station apparatus comprising:
control circuitry configured to and/or programmed to perform both of a contention based random access procedure to a base station apparatus and a non-contention based random access procedure to the base station apparatus, wherein both of the contention based random access procedure and the non-contention based random access procedure corresponds to at least one of the cells which belongs to a first cell group of the plurality of the cell groups, the control circuitry further configured to and/or programmed to perform a non-contention based random access procedure to the base station apparatus, wherein the non-contention based random access procedure corresponds to at least one of the cells belonging to a second cell group other than the first cell group, the control circuitry further configured to and/or programmed to:

indicate a random access problem corresponding to the first cell group in a case where a number of transmissions of a random access preamble exceeds a maximum number of retransmissions, and not indicate a random access problem corresponding to the second cell group in a case where the number of transmissions of a random access preamble exceeds the maximum number of retransmissions.

2. The mobile station apparatus according to claim 1, further comprising:

reception circuitry configured to and/or programmed to receive random access instruction information in a downlink control channel, wherein the control circuitry further configured to and/or programmed to perform a non-contention based random access procedure, in accordance with the random access instruction information.

3. A communication method for a mobile station apparatus applied to a mobile communication system in which a plurality of cells are allocated to the mobile station apparatus, the plurality of cells grouped into a plurality of cell groups, the communication method comprising:

performing both of a contention based random access procedure to a base station apparatus and a non-contention based random access procedure to the base station apparatus, wherein both of the contention based random access procedure and the non-contention based random access procedure corresponds to at least one of the cells which belongs to a first cell group of the plurality of the cell groups, performing a non-contention based random access procedure to the base station apparatus, wherein the non-contention based random access procedure corresponds to at least one of the cells belonging to a second cell group other than the first cell group, indicating a random access problem corresponding to the first cell group in a case where a number of transmissions of a random access preamble exceeds a maximum number of retransmissions, and no indicating a random access problem corresponding to the second cell group in a case where the number transmissions of a random access preamble exceeds the maximum number of retransmissions.

\* \* \* \* \*